United States Patent [19]
Eichhorn

[11] Patent Number: 5,669,624
[45] Date of Patent: *Sep. 23, 1997

[54] STROLLER

[75] Inventor: Anthony E. Eichhorn, East Amherst, N.Y.

[73] Assignee: Fisher-Price, Inc., East Aurora, N.Y.

[*] Notice: The term of this patent shall not extend beyond the expiration date of Pat. No. 5,590,896.

[21] Appl. No.: 635,254

[22] Filed: Apr. 12, 1996

Related U.S. Application Data

[63] Continuation of Ser. No. 304,663, Sep. 9, 1994, Pat. No. 5,590,896.

[51] Int. Cl.$^6$ .................................................. B62B 3/02
[52] U.S. Cl. ........................................... 280/642; 188/20
[58] Field of Search ..................................... 280/641, 642, 280/38, 657, 658, 47.34, 47.38; 188/20

[56] References Cited

U.S. PATENT DOCUMENTS

| | | | |
|---|---|---|---|
| D. 297,525 | 9/1988 | Baechler | D12/129 |
| D. 350,923 | 9/1994 | Schmidlin | D12/12 |
| 3,881,739 | 5/1975 | Laune | 280/42 |
| 4,072,318 | 2/1978 | Laune | 280/42 |
| 4,462,607 | 7/1984 | Nakao et al. | 280/644 |
| 4,506,907 | 3/1985 | Miyagi | 280/642 |
| 4,836,573 | 6/1989 | Gebhard | 280/644 |
| 4,962,965 | 10/1990 | Glover | 297/467 |
| 5,029,891 | 7/1991 | Jacobs | 280/650 |
| 5,188,389 | 2/1993 | Baechler et al. | 280/650 |
| 5,224,720 | 7/1993 | Chaw et al. | 280/62 |
| 5,257,799 | 11/1993 | Cone et al. | 280/642 |
| 5,301,963 | 4/1994 | Chen | 280/30 |
| 5,344,171 | 9/1994 | Garforth-Bles | 280/415.1 |
| 5,447,323 | 9/1995 | Huang | 280/642 |
| 5,454,584 | 10/1995 | Haut et al. | 280/642 |
| 5,482,311 | 1/1996 | Huang | 280/642 |
| 5,490,685 | 2/1996 | Kitayama et al. | 280/47.38 |

OTHER PUBLICATIONS

Racing Strollers Inc., "The Baby Jogger", 1992, catalog.
J. Mason "We Took The Road Less Traveled" (flyer promoting an all terrain stroller).

*Primary Examiner*—Richard M. Camby
*Attorney, Agent, or Firm*—Morgan, Lewis and Bockius, LLP; C. Scott Talbot

[57] ABSTRACT

A three-wheeled collapsible stroller which can be used on terrain that is more bumpy or uneven than the smooth terrain suitable for a conventional small-wheeled stroller, but that is also more maneuverable than a conventional three-wheeled "jogging stroller." The stroller has a folding frame and automatic side latches so that it is conveniently collapsible into a compact form for transportation and storage. The stroller also had a seat back that is quickly and conveniently adjustable between reclined and upright seating positions and that remains in the same reclined or upright position when folded and unfolded. The brakes of the rear wheels are automatically set when the stroller is fully folded.

16 Claims, 21 Drawing Sheets

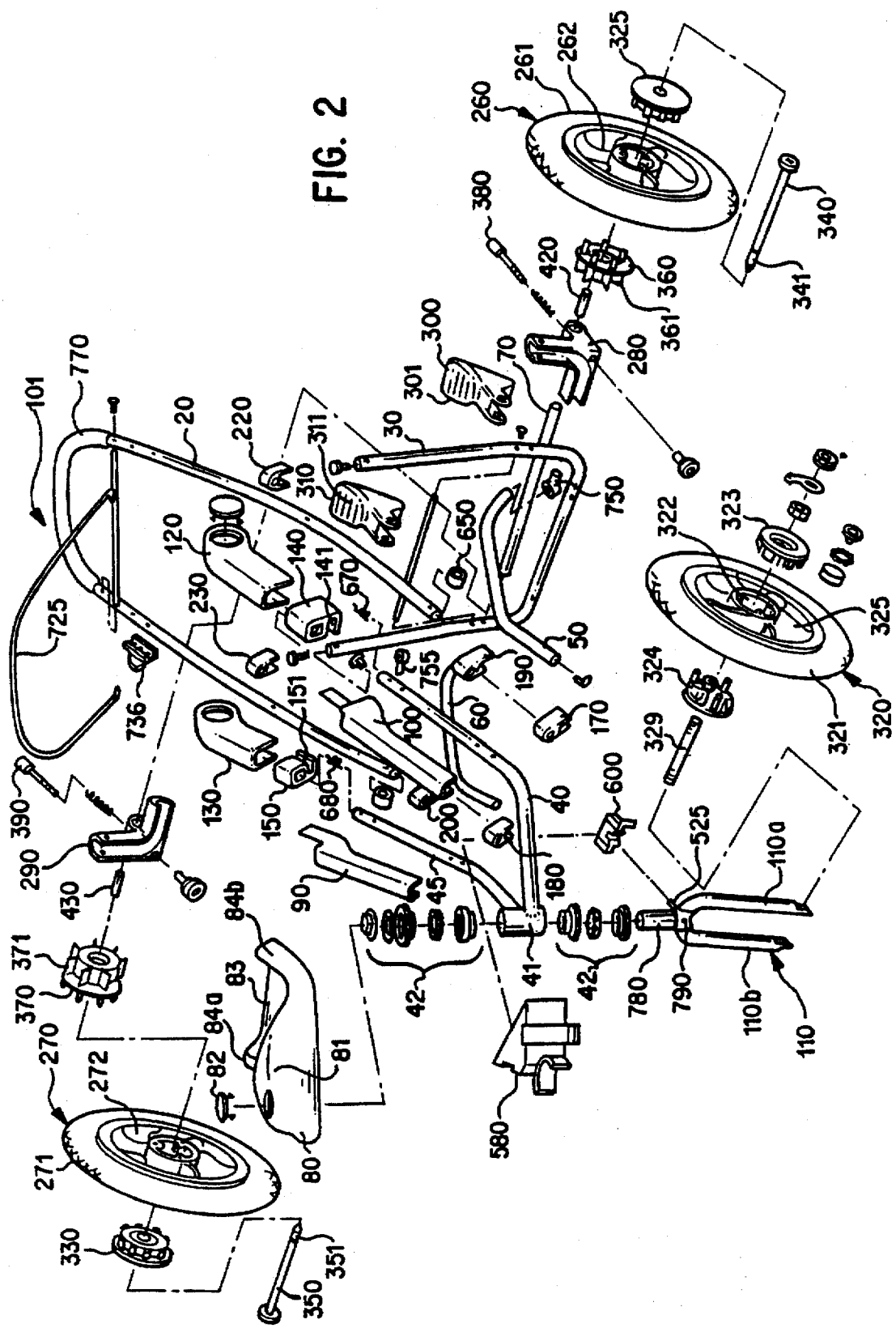

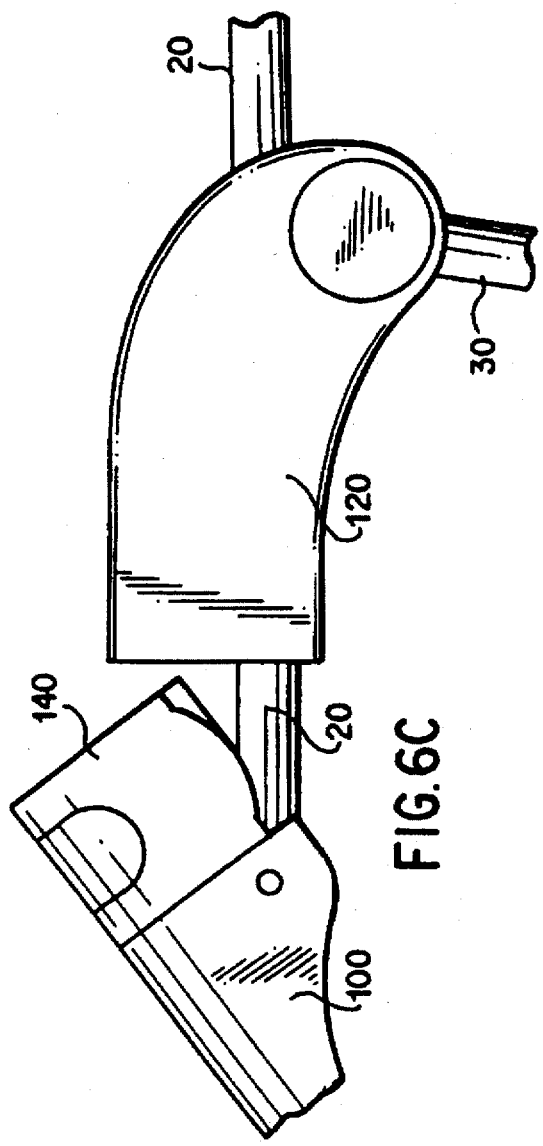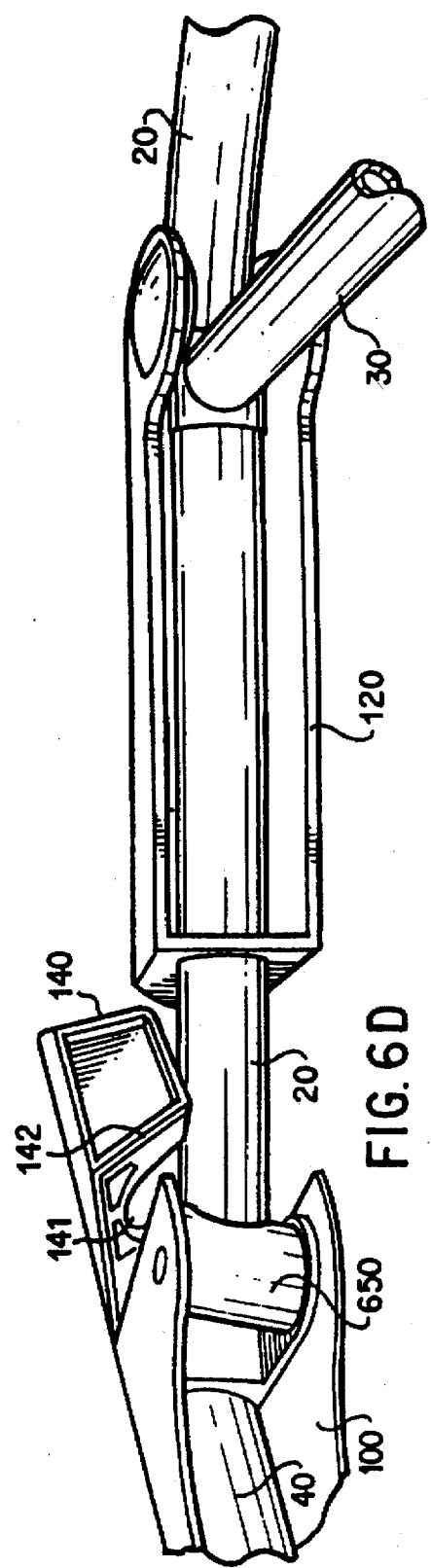
FIG.6C
FIG.6D

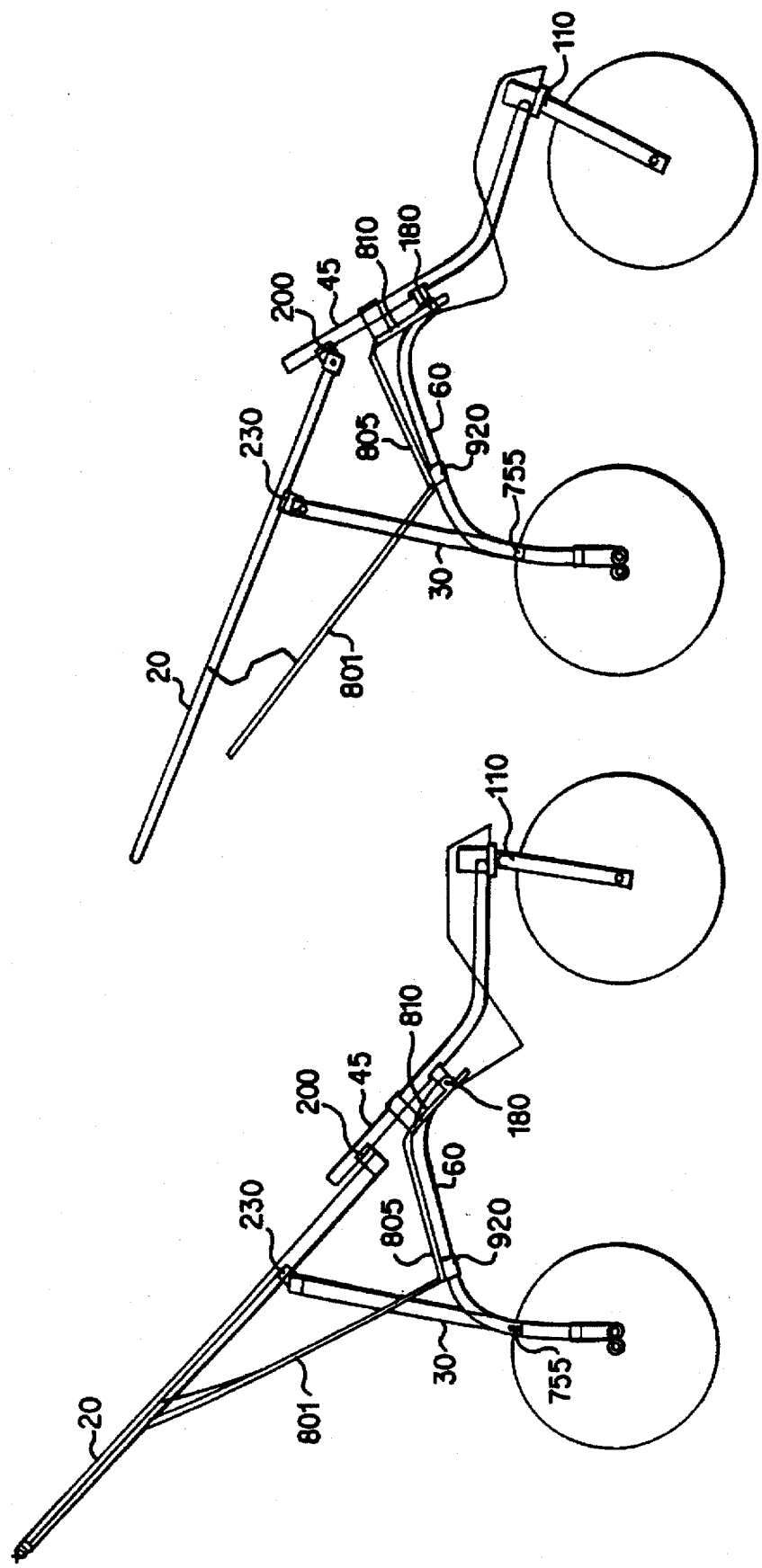

STROLLER

This application is a continuation of U.S. patent application Ser. No. 08/304,663 filed on Sep. 9, 1994 now U.S. Pat. No. 5,590,896.

BACKGROUND OF THE INVENTION

This invention relates to a stroller. More particularly, the invention relates to a three-wheeled child's stroller that has a selectively lockable, 360 degree pivoting front caster wheel and that folds conveniently and compactly for storage or portability. The stroller's design and wheel size are more suitable for rougher terrain and higher traveling speeds than a conventional stroller having small wheels. Further, the stroller is more compact and maneuverable than a conventional "jogging stroller" having three large bicycle-type wheels and tires. The invention also relates to a stroller having a convenient fold and automatic spring-loaded side latches for locking the stroller in the unfolded configuration. Additionally, the invention relates to a stroller having a reclining seat back and a child restraint seat belt.

There are a variety of types of conventional three-wheeled collapsible strollers known. For example, U.S. Pat. No. 3,881,739 to Laune describes a child's stroller having three wheels of a relatively small size, as are usually associated with a conventional stroller. The front wheel is of a steerable, caster type and has a brake and is lockable in a forward-only orientation. The stroller frame comprises of a pair of horizontal side elements pivoted on each other at their front ends and having upright members at their rear ends. The front ends meet at a front pivot point with articulated connections, which allow the side elements and upright members to collapse upon each other to fold the stroller, reducing the space occupied by the stroller. Footrests are provided on the front tubes below the seat and above and behind the front wheel.

A disadvantage of the stroller described in the patent to Laune is that it is limited to use only at relatively low speeds and only on relatively smooth surfaces by the small wheel diameters—a stroller with small wheels and tires is difficult to maneuver on bumpy surfaces. Thus, a conventional small-wheeled stroller is not well suited to some surfaces commonly encountered by users of strollers, such as bumpy pavement, grass, or packed dirt.

Another disadvantage of this stroller is that although the stroller folds longitudinally, bringing the two rear wheels in close proximity to each other, this fold produces a lengthy and cumbersome end product—the stroller in its folded state is necessarily at least as long as its wheelbase.

Accordingly, there exists a need both for a stroller that is operable on slightly uneven or bumpy surfaces and a fold for such a stroller that will yield a folded configuration which is compact for easy storage and/or portability.

Various bar linkages and fold patterns for strollers are known. Also, various latches for latching a folding stroller frame in a fully unfolded operative position are known. For example, U.S. Pat. No. 4,415,180 to Payne, Jr. illustrates a folding stroller utilizing a latch member which is pivotally connected to the first frame member and biased to a position wherein it embraces an end of a second member. The latch member may be released by finger pressure pivoting the latch member against the spring bias. The latch member has a cam surface thereon, so that the end of the second member may contact the cam surface and pivot the latch member whereby the second member will be snapped into a latched position without finger manipulation. The latch member pivots around a generally horizontal axis that is perpendicular to the tube axis.

The conventional four-wheeled stroller disclosed in the patent to Payne, Jr. also suffers from the disadvantage that it is limited for use only on relatively smooth surfaces due to the small wheel diameters. This stroller also is not suitable for use on the uneven or bumpy surfaces commonly encountered by users of strollers.

Another type of latch member for latching first and second frame members into a parallel, unfolded position is known in which the latch is mounted to and rotates about the longitudinal axis of one frame member. The latch has a resilient portion defining a groove that snaps partially around and onto the other frame member, to latch the frame members together.

A disadvantage of this design is that the latch must be manually rotated and engaged and rotated and disengaged whenever the user wishes to fold or unfold the stroller frame. Thus, when unfolding the frame (the latch is disengaged when the frame is folded), the latch must be manually engaged once the stroller is in its usable, unfolded configuration. Accordingly, this type of latch suffers from the disadvantage that the user must manually engage the latch by rotating it each time the stroller is unfolded.

U.S. Pat. No. 5,188,389 to Baechler et al. discloses a foldable three-wheeled "all-terrain" baby stroller of the type commonly referred to as a "jogging stroller." This stroller is better equipped to accommodate higher speeds and bumpy or uneven surfaces than a small-wheeled conventional stroller due to the utilization of large wheels.

A disadvantage of the stroller disclosed in the Baechler et al. patent is that the lower frame bars connecting the front and rear wheels do not fold—therefore even when folded the stroller is necessarily at least as long as its wheel base. Yet another drawback to the design is the absence of a directionally pivoting front wheel, which makes the simple task of turning the stroller an arduous one—the operator must push down on the handle to raise the front wheel off the ground to change direction.

Another "jogging stroller" is disclosed in U.S. Pat. No. 5,029,891 to Jacobs. The stroller includes three large-diameter wheels arranged in a tricycle configuration, a foldable frame to which the wheels are attached, and an infant holder made from flexible material supported by the frame. The frame includes a pivotally connected upper portion and a lower portion, whereby the portions may be folded against one another reducing the space occupied by the stroller. The front wheel is centrally located directly in front of the child. A floor panel intended for a foot rest is mounted to the front tubes and extends forward from under the child's seat and a fender covering the back side of the front wheel is attached to the floor panel and front axle.

A disadvantage of the stroller disclosed in the Jacobs patent is that this configuration places the occupants legs mostly or completely behind the front wheel, again elongating the overall length of the stroller. Further, the Jacobs patent depicts that the lower frame bars connecting the front and rear wheels do not fold—therefore once again even when folded the stroller is necessarily at least as long as its wheel base, as in the Laune and Baechler et al patents. Also, the provision of a floor panel and a separate fender increases the weight and complexity of the stroller as compared to a single unitary footrest/fender member. Another drawback in the stroller of the Jacobs patent is the implementation of a non-pivoting front wheel, again making steering cumbersome and difficult, as in the stroller disclosed in the Baechler et al. patent.

Accordingly, there exists a need for a stroller combining the advantages of a "jogging stroller"—the ability to traverse somewhat bumpy and/or uneven terrain—with the advantages of a conventional stroller—ease of maneuverability, compactness and convenient and compact foldability.

Reclining seats for strollers are also known. For example, U.S. Pat. No. 4,836,573 to Gebhard discloses an apparatus for supporting a child in a fully reclining (horizontal) position and in a sitting (generally upright) position. The child support is pivotable from the first, generally horizontal position for use as a bassinet to the second, generally upright or slightly tilted position for use as a forward-facing stroller seat. In the first configuration, a first planar member acts as a whole body support for a child to provide a bassinet or baby carriage configuration. In the second configuration, the first planar member is provided as a back rest and a second planar member is provided as a seat.

A disadvantage of the configuration described in the Gebhard patent is that it does not provide for conversion between an upright seated position and a reclined seated position—rather it only provides for a choice between one slightly reclined position or a fully lying down position. Accordingly, there exists a need for a stroller seat back that is conveniently adjustable between a relatively upright, seated position, and a more inclined, reclining seated position.

Another seat back recline is described as U.S. Pat. No. 4,462,607 to Nakao et al., in which the upper back section of a seating platform is suspended from the handle by an adjustable loop.

Wheel brakes employing a lever partially mounted to the stroller frame and having a pin that engages radial teeth in the wheel to brake the wheel when the lever is depressed are also known, as illustrated in U.S. Pat. No. 5,257,799 to Cone et al.

A disadvantage of the wheel brake of the type shown in the Cone et al. patent is that the brake must be manually set or released—since it does not automatically set when the stroller is folded, the user typically must set the brake when unfolding the stroller if it has not been set before folding.

Seat belt assemblies for child and infant seats are also known. For example, U.S. Pat. No. 4,962,965 to Glover discloses a seat belt assembly for use in a high chair comprising a pair of generally horizontally extending waist straps each coupled at one end to a portion of the high chair seat, and having a buckle part at the other end, a crotch strap permanently secured to a front central extent of the seat portion and having a free front end, and a main buckle permanently attached to the free end of the crotch strap with the main buckle also having a pair of attachment mechanisms for removably receiving the buckle parts of the ends of the waist straps.

Accordingly, there is a need for a three-wheeled collapsible stroller which can be used on terrain that is more bumpy or uneven than the smooth terrain suitable for a conventional small-wheeled stroller, but that is also more maneuverable than a conventional three-wheeled "jogging stroller." Furthermore, there is a need for such a stroller to be conveniently collapsible into a compact form for transportation and storage. Additionally, there is a need for a three wheeled stroller seat back that is quickly and conveniently adjustable between reclined and upright seating positions. Moreover, there is a need for a brake mechanism for the rear wheels of a folding stroller that automatically sets the brakes of the rear wheels when the stroller is fully folded.

SUMMARY OF THE INVENTION

The invention solves the problems and avoids the drawbacks of the prior art by providing a three-wheeled collapsible stroller which can be used on terrain that is more bumpy or uneven than the smooth terrain suitable for a conventional small-wheeled stroller, but that is also more maneuverable than a conventional three-wheeled "jogging stroller." The stroller has a folding frame and automatic side latches so that it is conveniently collapsible into a compact form for transportation and storage. The stroller also has a seat back that is quickly and conveniently adjustable between reclined and upright seating positions, and that is capable of remaining in the same position when unfolded and folded. The stroller also has a means for automatically setting the brakes of the rear wheels when the stroller is fully folded.

In one aspect, the invention relates to a folding stroller having a front wheel; a front member having a front wheel supporting portion for supporting the front wheel, and a pair of front member ends; a rear handle member having a handle portion and a pair of handle member ends; a pair of rear wheels; a rear support member having a pair of rear wheel supporting portions, each rear wheel supporting portion supporting a respective one of the rear wheels, and the rear support member having a pair of rear support ends; a pair of side members each having a first side member end and a second side member end. The handle member ends are pivotally connected to the front member ends, and the rear support member ends are pivotally connected to a medial portion of the handle member, the first side member ends are pivotally connected to portions of the front member and the second side member ends are pivotally connected, to portions of the rear member.

In another aspect, the invention relates to an automatic latch mechanism having a first tube having a first longitudinal axis, a pivot mount location, and a first end; and a second tube having a second longitudinal axis and a second end. A pivot mount is attached to the first tube at the first pivot mount location and has the second end pivotally mounted thereto the first and second tubes are pivotally connected to one another and are movable from a folded position where the first and second longitudinal axes are angled relative to each other to an unfolded position where said first and second longitudinal axes are parallel and offset. A latch handle is mounted about the first tube proximate to the first end, and is rotatable around the first longitudinal axis of the first tube. The latch handle defines a groove engagable with the second tube when the first and second tubes are in the unfolded position. The latch is rotatable between a first, engaging position wherein the groove engages the second tube, and a second, nonengaging position where the groove is not engaging the second tube, and the latch handle has a camming surface adapted for camming contact with the second tube when the tubes are in the unfolded angled position. A spring is provided for biasing the latch handle towards the first, engaging position. In another aspect the invention relates to a reclining seatback assembly, having a first frame portion; a second frame portion spaced apart from the first frame portion; and a generally rigid seatback portion.

A first flexible web extends between the first frame portion and the seatback portion, and has a first extended configuration in which the seatback is suspended in a first reclining position and a second, foreshortened configuration in which the seatback is suspended in a second position more upright than the first position. A second flexible web extends between the second frame portion and the seatback portion, the second web also having a first extended configuration in which the seatback is suspended in first, reclined position and a second, foreshortened configuration in which the seatback is suspended in a second position more upright than the first position. The webs may be selectively foreshortened to move the seatback from the first position to the second position.

In still another aspect, the invention relates to a foldable stroller having a folded configuration and an unfolded configuration having a first frame portion; a wheel rotatably mounted to the first frame portion; and a brake lever pivotally mounted to the first frame portion, the brake lever including a wheel engaging portion being pivotable between a first position at which the wheel engaging does not contact the wheel and a second position at which the wheel engaging portion engages the wheel to brake the wheel. A second frame portion is connected to the first frame portion for relative movement with respect to the first frame portion and the second frame portion contacts the brake lever to urge the brake lever into the second position when the stroller is in the folded configuration.

BRIEF DESCRIPTION OF THE DRAWINGS

FIG. 2 is an exploded view of the frame of the stroller with the seat assembly removed.

FIGS. 6C and 6D are side and bottom views, respectively, of the side hinge and side latch mechanism in an intermediate partially folded angled position.

FIGS. 10A, 10B, 10C, 10D, 10E and 10F are schematic side views representing the folding sequence of the stroller frame.

DETAILED DESCRIPTION

Figure 1A:
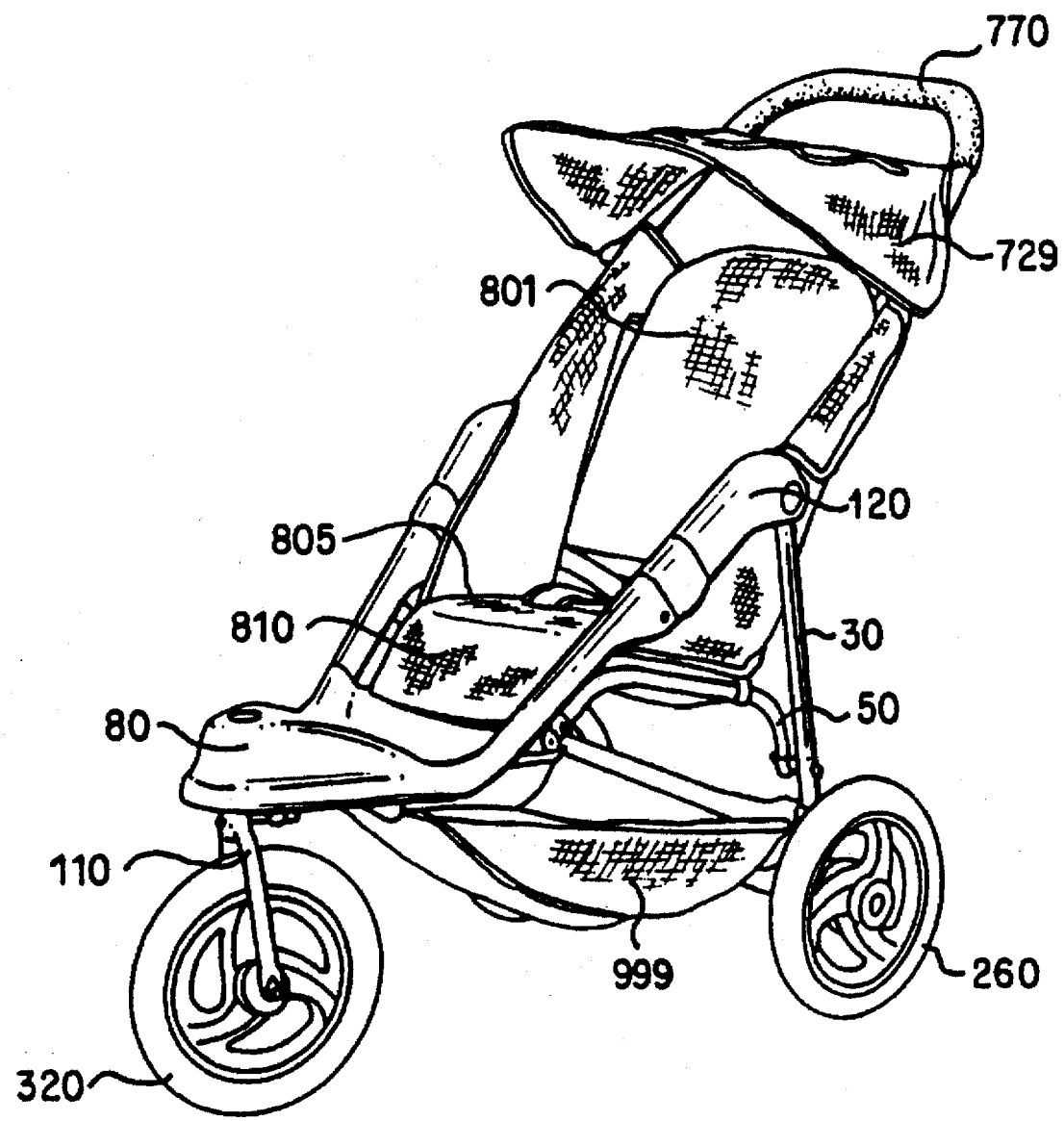
FIG. 1A is a perspective view of the stroller.

Reference will now be made in detail to presently preferred embodiments of the invention, examples of which are illustrated in the accompanying drawings.

1. Overall Stroller Configuration

The overall stroller configuration will now be described. Several of the features described briefly under this heading are described in more detail below under separate headings.

As shown in FIGS. 1A, 1B, 1C and 2 the stroller generally comprises a foldable frame including a handle tube 20, front tubes 40, 45, a rear support tube 30, and two seat tubes 50, 60. (The handle tube 20 may include a padded grip portion 770. A front fork assembly 110 supports a front wheel assembly 320 which is selectively lockable into a straight-ahead position and releasable to pivot in a caster-type fashion. Two rear axle mounting brackets 280, 290 support an axle tube 70 to which are mounted two rear wheels 260, 270 that are independently removable. Each rear bracket 280, 290 features a brake mechanism actuated by depressing a brake lever 300, 310, and releasable by raising the brake lever 300,310.

A pivoting arched canopy wireframe 725 pivots on the handle tube 20 to support a piece of canopy fabric 729 that may be flipped into an extended canopy shading position or a retracted position.

Figure 4A:
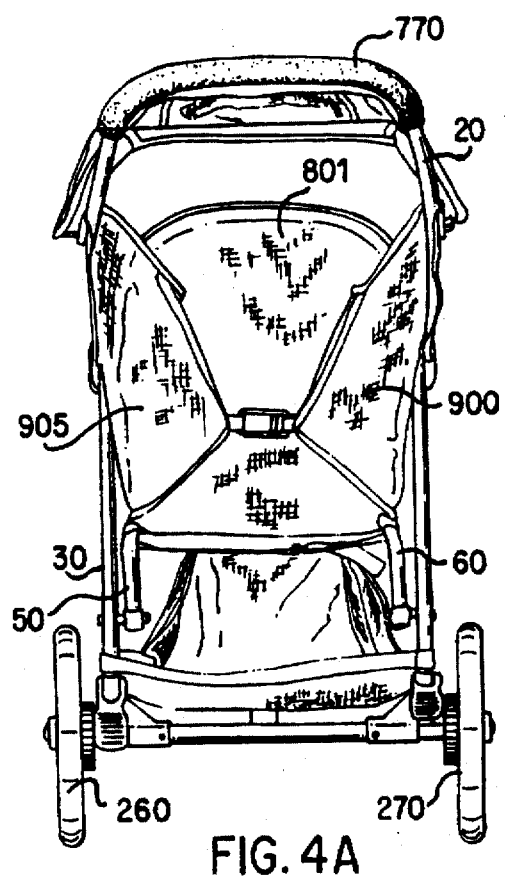
FIG. 4A is a perspective view of the seat back in an upright position.
Figure 4B:
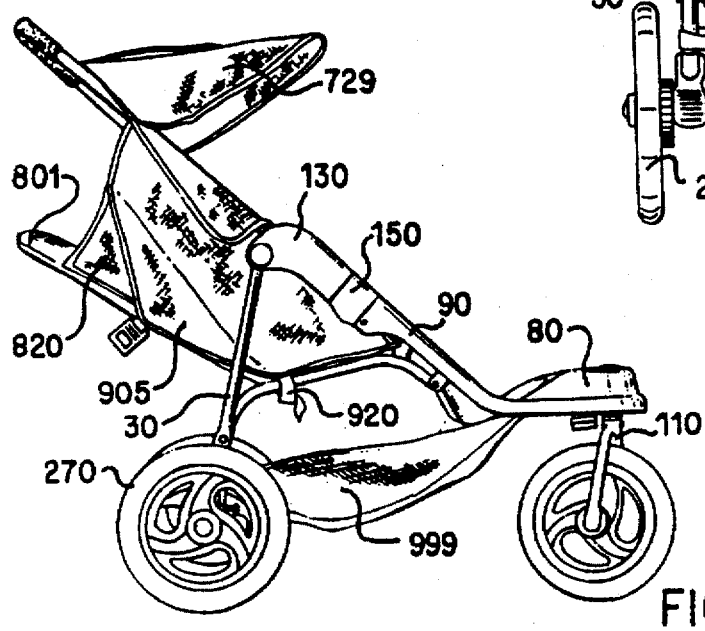
FIG. 4B is a perspective view of the seat back in a reclined position.
Figure 1C:
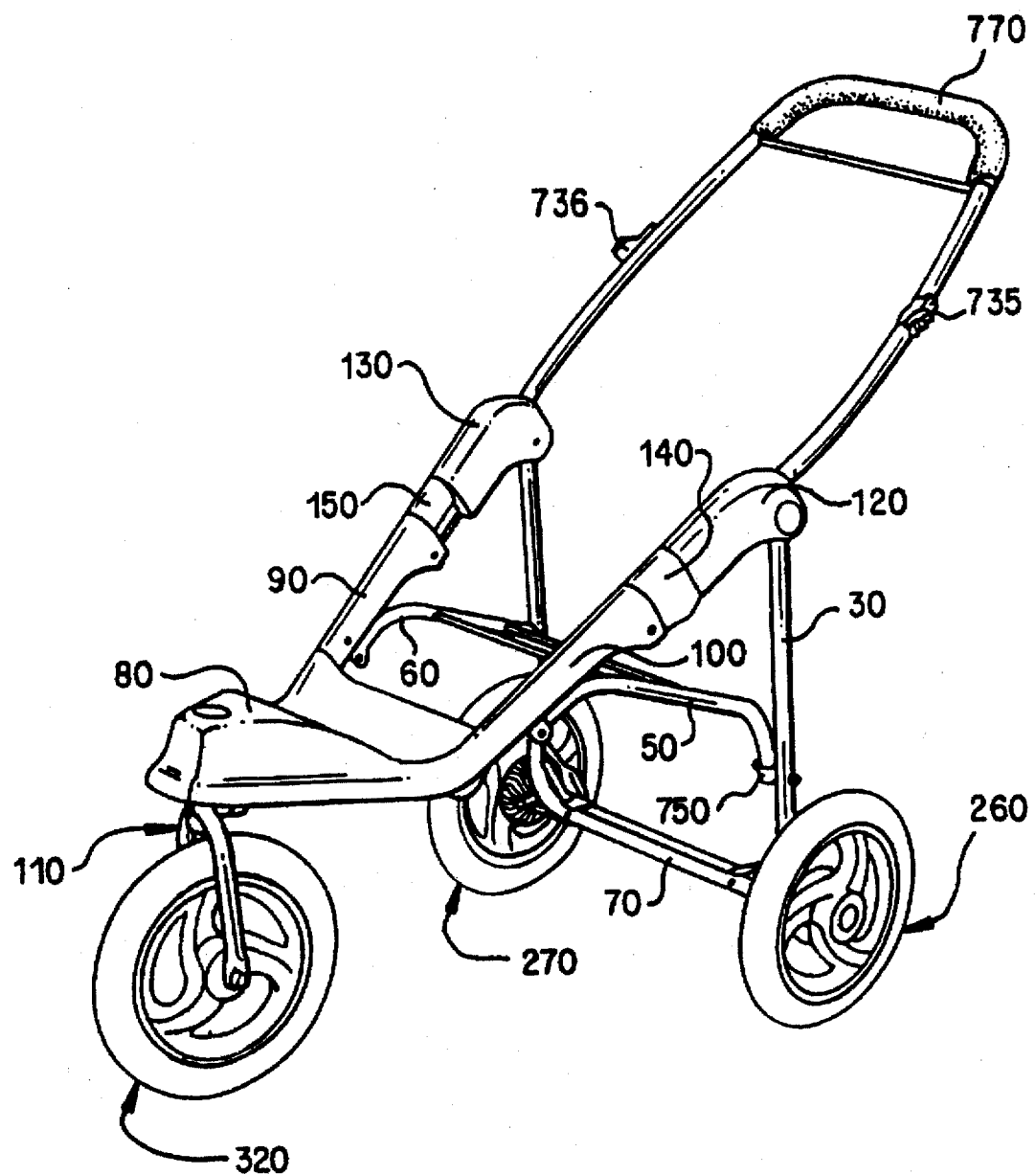
FIG. 1C is a perspective view of the frame of the stroller with the seat assembly removed.

A fabric seating assembly 800 (illustrated in more detail in FIGS. 4A, 4B, 11A and 11B) is suspended between the handle tube 20 and the front tubes 40, 45 and includes a rigid seatback 801 suspended at its sides by fabric web 815, 820. The seatback 801 has a reclined position in which it is supported by the side webs 815, 820 stretched taut (as best shown in FIG. 4B). The side webs also each feature an extension web 900, 905 extending from a part of each side web. A male clip 915 on the end of one extension web 905 and a female clip 910 on the other extension web 900 can be clipped together, thereby pulling the side webs 815, 820 in behind the rigid back panel 801 to secure the seat back in an upright position (as best shown in FIG. 4A).

The side fabric webs 815, 820 are attached to the handle tube 20 at attachment points located near the canopy pivot, and near parts 120 and 130. In the illustrated embodiment, the webs are attached to the tubes with hook and loop fasteners. In another preferred embodiment the webs may be more permanently attached to the handle tube by screws. The side webs 815, 820 and the front of the seat bottom 805 are also attached to the front tubes 40, 45 at a location just above the pivoting connection of the seat tubes 50, 60 and the lower portion of the front tubes 40, 45. Near the vertex of the seat bottom 805 with the seat back 801, the side webs 815,820 (and hence the seat bottom 805 and the seat back 801 ) are attached to the seat tubes in a sliding manner, e.g., by a strap 920, 925 passing outside and under the seat tubes 50, 60. This sliding connection permits the stroller frame to be folded, while the seat back remains in either the upright or reclining position, as described in more detail below with reference to the folding sequence.

Referring now particularly to FIG. 2, the handle tube 20 is pivotally connected at its lower ends to the front tubes 40, 45 by means of an upper pivot mount 200 and an upper left pivot mount 190. The front tubes 40, 45 have their vertex at a heady vertical head tube 41 which has a conventional headset assembly for mounting a fork shaft 780 of the fork 110 so that the fork 110 may pivot along the longitudinal axis of the head tube, which is offset slightly back from vertical. The front wheel 320 is mounted at the bottom of the fork 110. A footrest 80 may be provided mounted to the lower front part of the front tubes 40, 45 over the front wheel 320 as shown and may include a decorative cap 82. This footrest 80 also serves as a fender and a fairing over the front wheel 320.

Left and right seat tubes 50, 60 are mounted to the front tubes 40, 45 by right front seat tube pivot mount 180 and left front seat tube pivot mount 170 as shown. Both seat tubes 50, 60 are pivotally mounted at their other ends to the rear tube 30 by left and right rear seat tube pivot mounts 750 and 755, respectively. The rear tube 30 is generally U-shaped and is pivotally mounted at its top ends to the handle tube 20 by means of a upper right pivot mount 230 and a upper left pivot mount 220. Right and left axle brackets 280, 290 are mounted at the lower corners of the rear tube 30. The right and left axle brackets 280, 290 each have a hole for receiving an axle tube 70 that extends therebetween and the left and right wheels 260, 270 are each mountable detachably on stub axles 340, 350, respectively that fit in the left and right ends of the axle tube 70, respectively. The ends of the axle tube may be fitted with sleeves 420, 430.

Each of the left and right rear wheels 260, 270 includes a two-piece center hub including an outer center hub 325, 330 and an inner center hub 360, 370 with a stub axle 340, 350 that can be inserted therethrough. The end of the stub axles 340, 350, after being inserted through the wheels 260, 270 are inserted into the ends of the axle tube 70. Spring-loaded pins 380, 390 engage annular grooves 341, 351 in the stub axles 340, 350 to removably secure the wheels in the axle tube 70. In this way the rear wheels 260, 270 are each removably attached. The stub axles 340, 350 each have a tapered end so that when inserted they slidingly contact the end of the pin 380, 390 at an angle and push it out against the spring force, permitting the stub axle 340, 350 to be fully inserted. Once fully inserted, the pin 380, 390 engages the annular groove 341, 351 so as to secure the stub axle 340, 350. The wheel 260, 270 is disengaged by simultaneously pulling out on a spring loaded pin 380, 390 and pulling off the wheel.

A brake pedal 300, 310 is pivotally mounted to each axle bracket 280, 290 and is pivotable between two detented positions. In an upper position, the brake pedal 300, 310 does not interfere with rotation of the wheel 260, 270. However, when the brake pedal 300, 310 is depressed, a pin 301, 311 (depicted in FIG. 8A) extending outwardly from the brake pedal engages radial teeth 361,371 on the inner center hub 360, 370 to lock the wheel 260, 270 and prevent it from rotating.

Returning again to the frame, optional right and left upper covers 120, 130 are provided over the lower portions of the handle tube and cover the pivoting connection of the rear tube 30 and the handle tube 20. An inwardly spring-biased pivoting latch 140, 150 on each side rotates about the longitudinal axis of the front tubes 40, 45 and has an inner groove 141, 151 for engaging the handle tube 20 to hold the stroller in the fully unfolded position. Optional left and right lower covers 90, 100 cover the upper ends of the front tubes 40, 45 and also covers the pivoting connections of the front tubes 40, 45 to the handle tube 20. The construction and operation of the side latches 140, 150 and the folding sequence of the frame are both discussed in more detail below.

Each of the wheels 260, 270, 320 has a foam rubber tire 261, 271, 321 having an all-terrain type tread mounted on to a rim with a spoked intermediate hub 262, 272, 322 and two-piece plastic center hub 325, 360, 330, 370, 323 and 324. On the front wheel 320, a conventional roller bearing type axle 329 is provided and is mounted to the lower end of the fork 110. The rear wheels 260, 270 frictionally rotate on the stub axles 340, 350 that are inserted into sleeves 420, 430 on the ends of the axle tube 70, which is mounted to the rear tube 30 by the axle mounting brackets 280, 290. As noted above, each rear wheel 260, 270 has its own independently operable brake 300, 310.

Figure 1B:
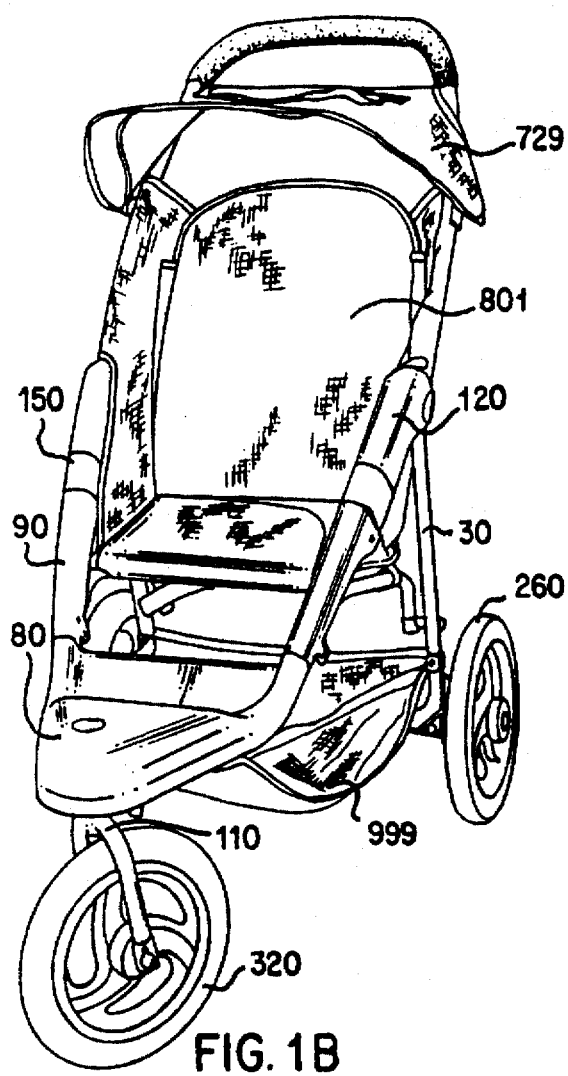
FIG. 1B is a perspective view of an alternative embodiment of the stroller with an access flap opened.

At the front of the seat bottom, a leg rest flap 810 is provided that may be flipped up as shown in FIG. 1B to provide access to a cargo compartment 999 located under the seat bottom. The cargo compartment 999 is a fabric basket suspended from the lower part of the rear tube 30 just above the wheel mounting brackets and attached to the front tubes 40, 45 underneath the footrest 80.

2. Lockable Pivoting Front Caster

Referring particularly to FIGS. 2 and 3A through 3C, the front fork assembly 110 includes a body portion having a left fork 110a, a right fork 110b, and a fork shaft 780. A shaft 780 extends into a conventional head set assembly 42 in the center head tube 41, to secure the front fork assembly 110 to the front tubes 40, 45 so that the front fork assembly 110 is free to rotate 360 degrees, in either direction, with respect to the frame of the stroller. The fork 110 also includes a swivel locking pin 525. In this embodiment, the locking pin 525 is a conventional bolt which extends through the fork crown 790 and extends outward from the fork crown 790.

The front wheel 320 is rotatably mounted to the front fork assembly 110 by a front axle assembly, which is a conventional axle assembly that includes a ball bearing assembly, and a front axle 329 that extends through the axle bore of the front wheel. Axle nuts are tightened over washers on the outside of the fork to secure the wheel in place.

The front fork assembly 110 has a design that is similar to that of a conventional caster in that when the stroller is traveling in the forward direction, the axis of rotation of the front wheel is horizontally displaced rearwardly from the vertical rotational axis of swivel of the shaft 780. In other words when moving in the forward direction, the front wheel 320 will be urged by friction between itself and the traveling surface to swivel to a stable position in which the front wheel trails the head assembly 42. This feature is accomplished by constructing the front fork assembly 110 so that although the shaft 780 is rotatably positioned to the stable position, the fork sides 110a, 110b depend from the crown 790 at a slight rearward angle (with respect to the axis of rotation of shaft 780). Furthermore, in this stable position, the locking pin 525 extends rearward from the crown 790.

A footrest retainer 580 includes a body portion 581 which has left and right arms 582, 583, which are generally "L" shaped and depend downward from body portion 581 along the inner sides and under the left and right sides of the front tubes 40, 45 respectively. Left and right guide rails 585, 586 depend downward from the left and right arms 582, 583, respectively, and are oriented so that the rail's longest sides are parallel with the forward and rearward directions of motion of the stroller. In this embodiment, left guide rail 585 includes a rib 587 that protrudes from the outside surface. The front portion 584 of the body portion 581 is semicircular shaped to mate with head tube 41. Consequently, when the footrest retainer 580 is mounted, the body portion 581 rests on top of the front tubes 40, 45 with the front portion 584 abutting against the head tube 41, while the arms 582, 583 extend down along the inside and under the front tubes 40, 45.

The footrest 80 includes a body portion 81, a grooved feet receiving portion 83, and right and left rear frame receiving portions 84a, 84b, respectively. The footrest 80 is fastened to the footrest retainer 580 in any conventional fashion such as by two screws (not shown), which extend through the body portion 581 of footrest retainer 580 and into the underside of the footrest 80. The right and left frame receiving portions 84a, 84b are shaped to receive the upwardly extending portions of front tubes 40, 45 and act to prevent foot rest 80 from moving in a rearward direction.

Once the footrest retainer 580 and the footrest 80 are mechanically coupled (by screws or any other conventional manner), the assembly (footrest retainer 580 and footrest 80) is prevented from moving in an upwardly vertical direction, with respect to the stroller frame, by the arms 582, 583 of footrest retainer 580, which extend under the front tubes 40, 45. The assembly is prevented from moving rearwardly because the right and left frame receiving portions 84a, 84b of the footrest 80 abut against pivot mounts 170 and 180, which are attached to the front tubes 40, 45. The assembly cannot move downward since the body portion 581 of footrest retainer abuts against the top sides of the front tubes 40, 45. Furthermore, the assembly cannot move in the forward direction because the semi-circular front portion 584 of the body portion 581 of the footrest retainer 580 abuts against the rear side of the head tube 41. Consequently, once footrest 80 and footrest retainer 580 are mechanically coupled (as with screws), they are fixed in position and cannot move in any direction with respect to the stroller frame.

A swivel lock 600 includes a body portion 601 having a right slot 602 and a left slot 603 which are sized and shaped to receive right and left guide rails 586, 585, of footrest retainer 580, respectively. The left slot 603 has a first notch 604 and a second notch 605, which are sized and shaped to receive a rib 587 of the left guide rail 585. In addition, at least the left slot 603 has a handle 608 that extends outwardly and downwardly from its forward-most outside corner. The body portion 601 also includes a locking groove 610 positioned between left and right inwardly directed cam surfaces 616, 615, respectively. The groove 610 is sized and shaped to receive the locking pin 525.

The swivel lock 600 is slidably fastened to the footrest retainer 580 by screws 618, which extend through washers 619 and into the left and right guide rails 586, 585, respectively. Therefore, the swivel lock 600 is prevented from moving in the vertical direction by screws 618 and prevented from moving in a horizontal direction that is perpendicular to the longitudinal center-line of the stroller because the slots 602, 603 are substantially the same width (and therefore do not allow the swivel lock 600 to slide laterally) as rails 585, 586, respectively.

Figure 3A:
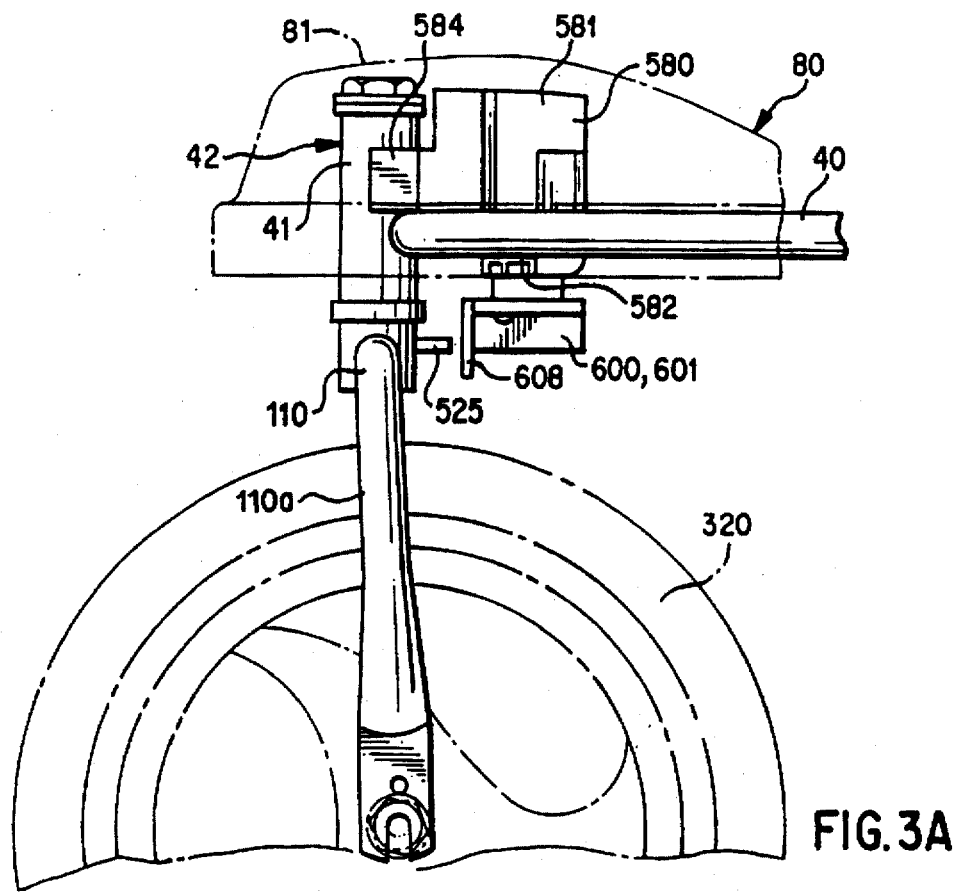
FIG. 3A is a side view of the front end of the stroller.
Figure 3B:
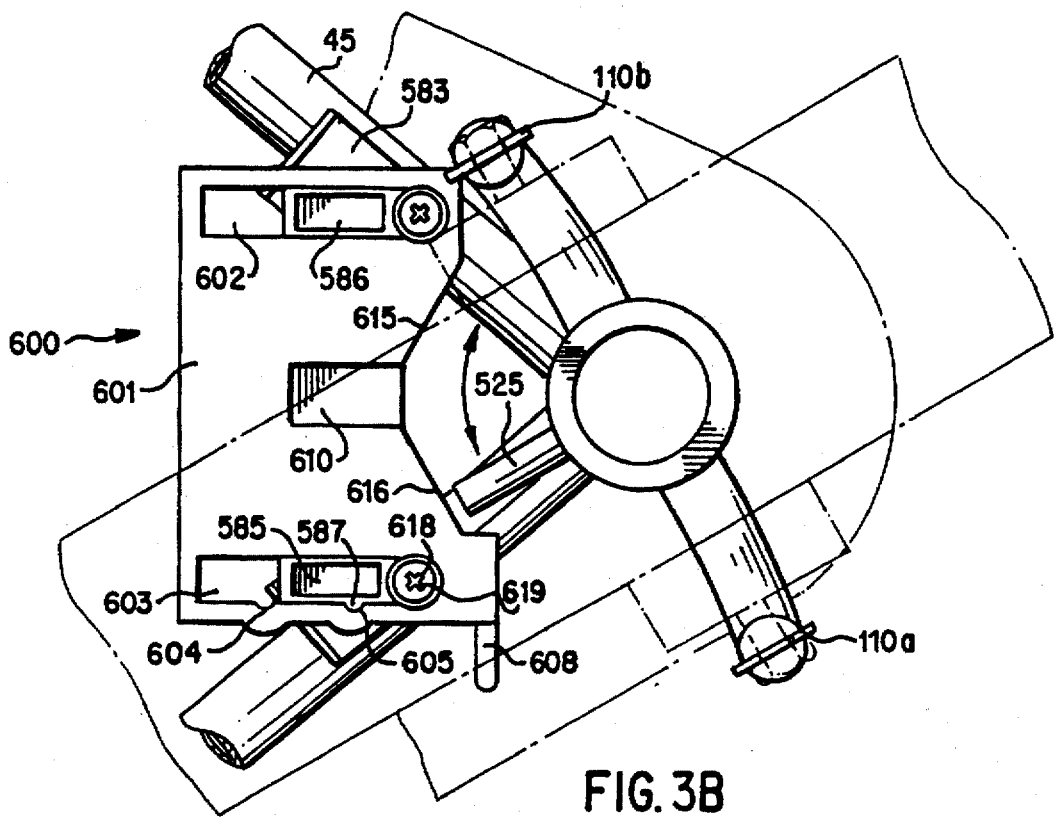
FIGS. 3B and 3C are bottom views of the front end of the stroller.
Figure 3C:
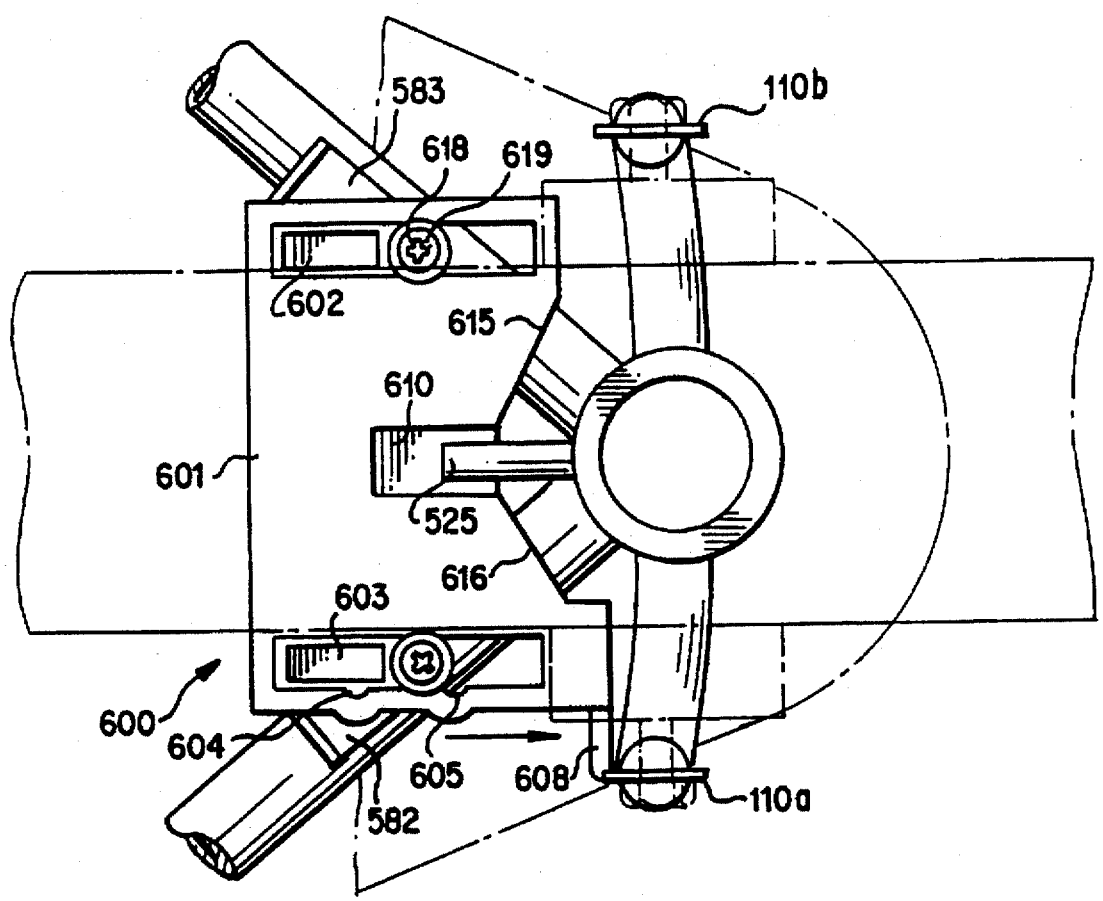

However, the swivel lock 600 can slide horizontally along a path that is parallel to the longitudinal center-line of the stroller (and thus parallel with the longer sides of guide rails 585, 586) between a first forward engaging position, shown in FIG. 3C, and a second rearward non-engaging position, shown in FIG. 3B. In the first forward engaging position, locking pin 525 is disposed in locking groove 610 and since swivel lock 600 cannot move laterally (as discussed above), groove 610 acts to hold locking pin 525 in the rearward position so that the front fork assembly 110 is locked in the stable forward position (and the front wheel 320 is positioned for forward movement). Since the locking pin 525 is fixed to the fork assembly 110, the front fork assembly 110 is prevented from swiveling and is in a swivel lock mode. Furthermore, in the first forward engaging position, the rib 587 of the left guide rail 585 engages the first notch 604 of the left slot 603 to provide resistance to the swivel lock 600 from inadvertently sliding backward.

In the second rearward non-engaging position shown in FIG. 3B, the swivel lock 600 is positioned rearwardly further away from front fork assembly 110 so that the swivel lock (and therefore the locking groove 610) does not engage the locking pin 525. In this position, the front fork assembly is free to rotate and is in a free swivel mode. Furthermore, in the second rearward non-engaging position the rib 587 of the left guide rail 585 engages the second notch 605 of the left slot 603 to provide resistance to the swivel lock 600 from inadvertently sliding forward.

For transition from the free swivel mode to the swivel lock mode, the user rotates the front wheel 320 (and therefore the front fork assembly 110) to approximately the stable forward position, in which the front wheel is positioned for forward movement of the stroller and the locking pin extends substantially rearward of the fork 110. The user then slides swivel lock 600 forward, utilizing the handle 608, from the rearward nonengaging position to the forward engaging position. If the locking pin 525 is perfectly aligned with the locking groove 610, the locking pin 525 will simply gradually (as the user slides swivel lock 600) extend into locking groove 610. If the locking pin 525 is not perfectly aligned with the locking groove 610, the locking pin 525 will strike either right or left inwardly directed cam surfaces 615, 616, respectively, which will commonly direct the locking pin 525 into alignment with the locking groove 610. In either instance, the front fork assembly will end up in the swivel lock mode.

For transition from the swivel lock mode to the free swivel mode, the user simply slides the swivel lock 600 rearward, utilizing handle 608, from the forward engaging position to the rearward nonengaging position. In this position as discussed above, the locking pin 525 is no longer disposed in locking groove 610 and therefore front fork assembly 110 is free to swivel.

3. Seat Back Recline

Figure 11A:
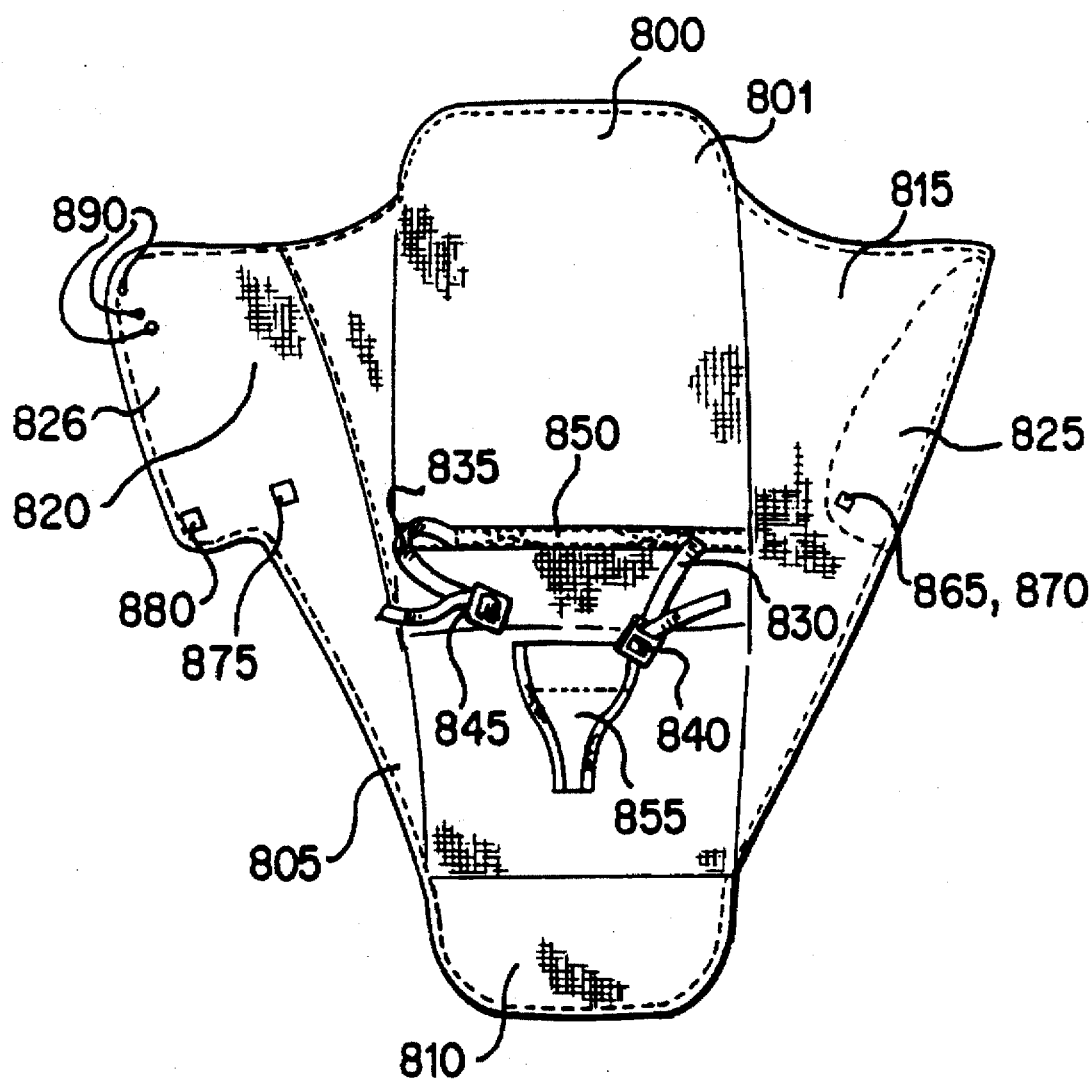
FIGS. 11A and 11B are front and rear views of the fabric seating assembly removed from the stroller frame and laid generally flat.
Figure 11:
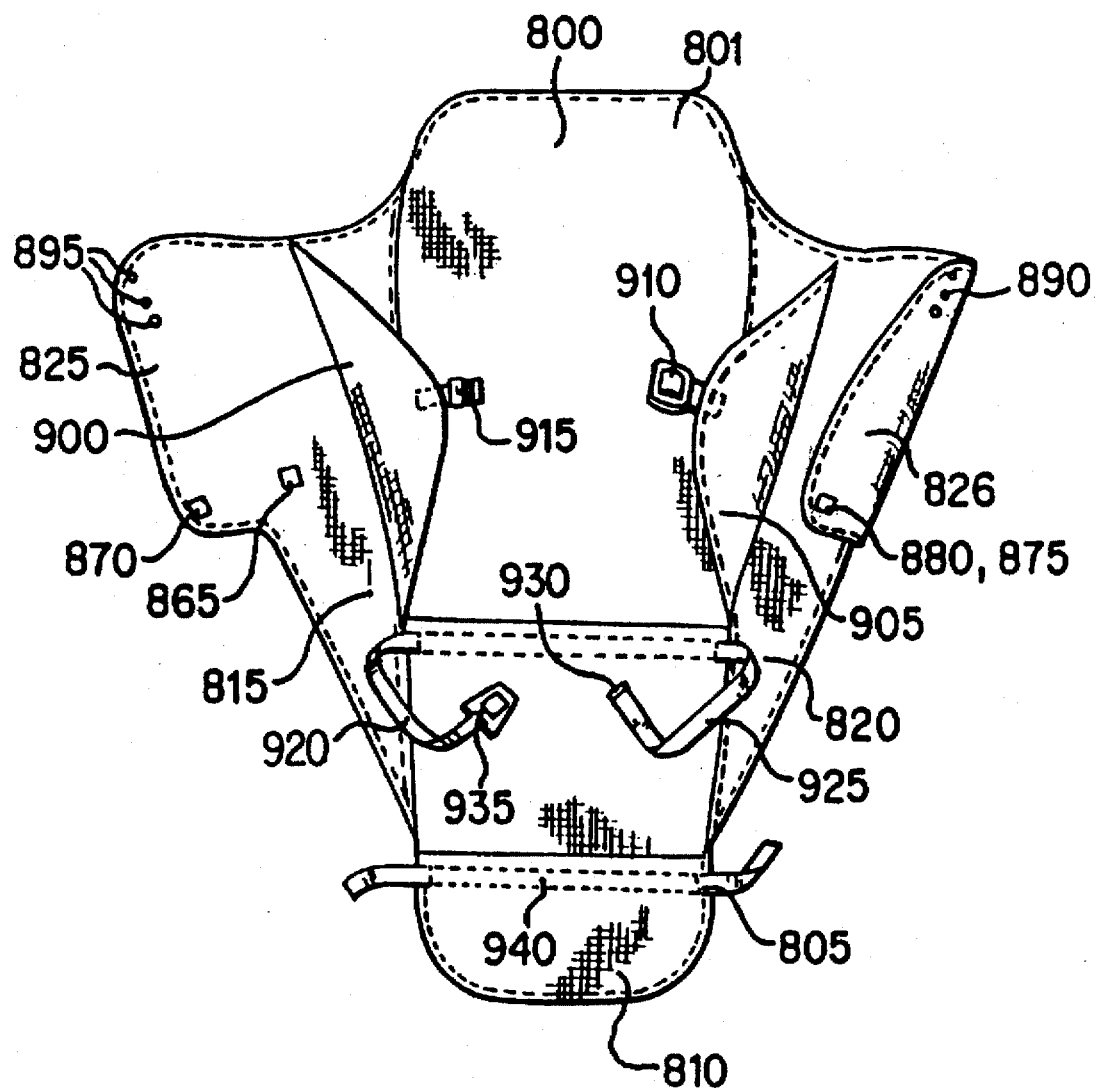

The seat back recline will now be described making particular reference to FIGS. 4A, 4B, 11A and 11B. Shown in FIG. 11A is the front view of the overall design of the components comprising the reclining stroller seat assembly. The seat assembly consists of a back rest portion 801 permanently attached to a seat portion 805 which is permanently attached to a leg rest flap 810. Attached along the periphery of the back rest portion 801 and the seat portion 805 are left and right web sections 815, 820 which when attached to the frame of the stroller function as the sides of the stroller seat. Both left and right web sections 815, 820 contain appendages 825, 826 which are intended to fold around the handle tube 20, fastened to the upper portion of the handle tube 20 by the right and left canopy mounts 735, 736, through holes 890, 895 in the web section, the lower section of the web appendage fastened to the handle tube 20 by hook-and-loop type fasteners 865, 870, 875, 880, or alternatively, fabric retainers with screws.

Attached to the front of the back rest portion 801 are right and left side waist straps 835, 830, which may be attached by a horizontal step 850, Stitched to the seat portion 805 is the center crotch portion 855. The back rest portion 801, the seat portion 805, and the leg rest flap 810 consist of a light weight rigid backing, such as hard board, plywood or plastic, with a foam-like material attached to the front side for the comfort of the occupant.

Stitched to the back side of the left and fight webs 815, 820 are the left and right extension webs 900, 905. The extension webs 900, 905 are appropriately angled inward from the top of the web sections 815, 820 to the intersection of the back rest portion 801 and the seat portion 805, Attached to the left extension web 900 via a fabric loop is a male buckle part 915 and attached to the right extension web 905 via a fabric loop is a female buckle part 910. When the male 915 and female 910 buckle parts are joined, the seat back portion 801 is positioned in the upright position (shown in FIG. 4A) and when uncoupled lies in the reclined position (shown in FIG. 4B). The seat portion 805 of the stroller seat remains in the same position and angle irrespective of the position of the seat back 801. The back rest portion 801 pivots at the intersection of the back rest portion 801 and the seat portion 805.

Therefore, in the preferred embodiment, the exterior webs 900, 905 serve as a means for foreshortening the webs 815, 820 to pull the back rest panel 801 into a more upright position.

In alternative embodiments, the webs 815, 820 might be forshortened in other ways. For example, the webs 815, 820 might each include a pair of zipper halves arranged in V-configuration with part of the webs 815, 820 serving as a gusset or dart between the zipper halves. When the zipper halves are unzipped, the seat back rest panel 801 reclines, supported by the webs 815, 820. When the zippers are zipped, the seat back rest portion 801 is pulled up into a more upright position, because the gusset or dart portions of the webs 815, 820 would be taken up as slack, and the webs 815, 810 are effectively foreshortened by the distance between the unzipped zipper halves, which are now zipped together As illustrated by the rear view in FIG. 11B, just below the intersection of the back rest portion 801 and the seat portion 805 lies a horizontal strip to which the right and left sliding seat mount straps 925, 920 are attached. At the end of the left sliding seat mount strap 920 lies a conventional buckle consisting of two seem-circular rings 935. The end of the right sliding seat mount strap 925 is interwoven between the rings 935 at the end of the left sliding seat mount strap 920 to couple the left and right sliding seat mount straps around the left and right seat tubes 50 and 60. The loop formed by the left 920 and right 925 sliding seat mount straps around and under the left and right seat tubes 50, 60 slides along the tubes during the folding process. This allows the seat back to remain in the upright or reclined position when folded and unfolded.

As seen in FIG. 11B, just below the intersection of the seat portion 805 and the leg rest flap 810 lies a horizontal strip 940 which extends beyond the length of the leg rest flap 810 in both directions. The ends of the horizontal step section 940 are attached to the left and right front tubes 40, 45 via screws near the juncture of the front tubes 40, 45 and the handle tube 20. The leg rest flap 810 pivots about the intersection of the seat portion 805 and the leg rest flap 810.

4. Automatically Latching Side Frame Latches

The front tubes 40, and 45 have optional lower cover members 100, 90, as well as spring-loaded latch handles 140, 150. When the frame is in the fully extended, unfolded orientation, the lower grooves 141, 151 in the latch handles 140, 150 engage the handle tube 20 to hold the frame in the fully unfolded position.

The left side latch handle 140 and its associated parts are illustrated in detail in FIGS. 5A through 6F. The right side latch handle 150 is symmetrically opposite and operates in the same manner as the left side latch handle 140.

The latch handles 140, 150 are biased into this locked position by coil torsion springs 670, 680, having one end 671 (spring 670 is shown in detail in FIG. 5A) attached internally to the cover member 100, which is fixed to the front tube 40 and the other end 672 connected to the latch handle 140. To release the stroller from the fully unfolded locked position, the latch handles 140, 150 are simultaneously rotated outward so that the inner grooves 141, 151 clear the handle tube 20. With the latch handles 140, 150 so rotated outward, the handle tube 20 may be pivoted downward relative to the front tubes 40, 45 to begin the folding procedure. The entire stroller frame may be then be folded in the sequence shown in FIGS. 10A through 10F (the folding sequence is discussed in more detail below).

Figure 5A:
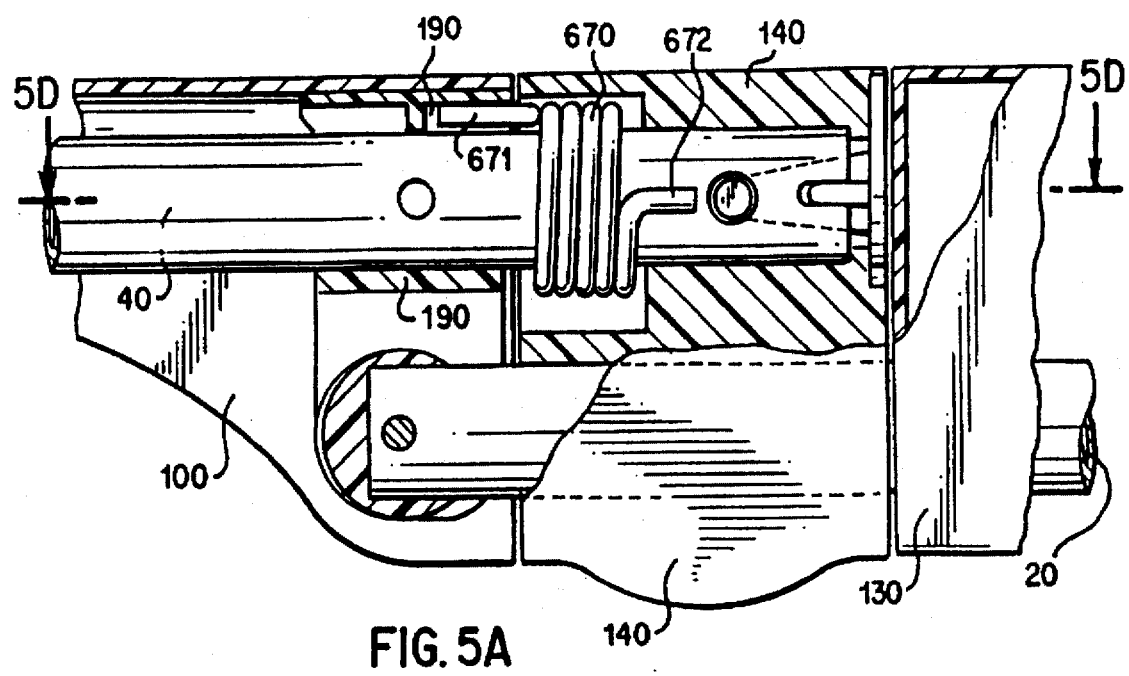
FIG. 5A is a side partially cutaway/sectional view of an automatically latching side latch mechanism.
Figure 5B:
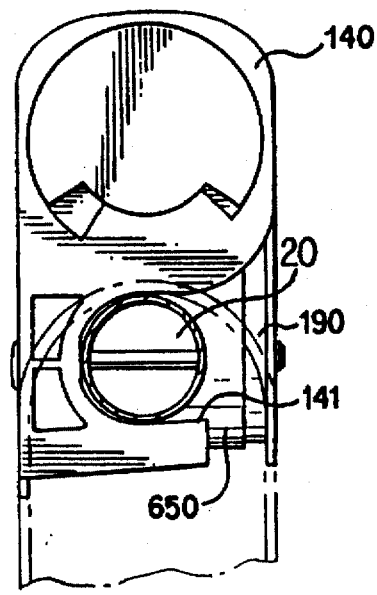
FIG. 5B is an end view of the side latch mechanism in a locked position.
Figure 5C:
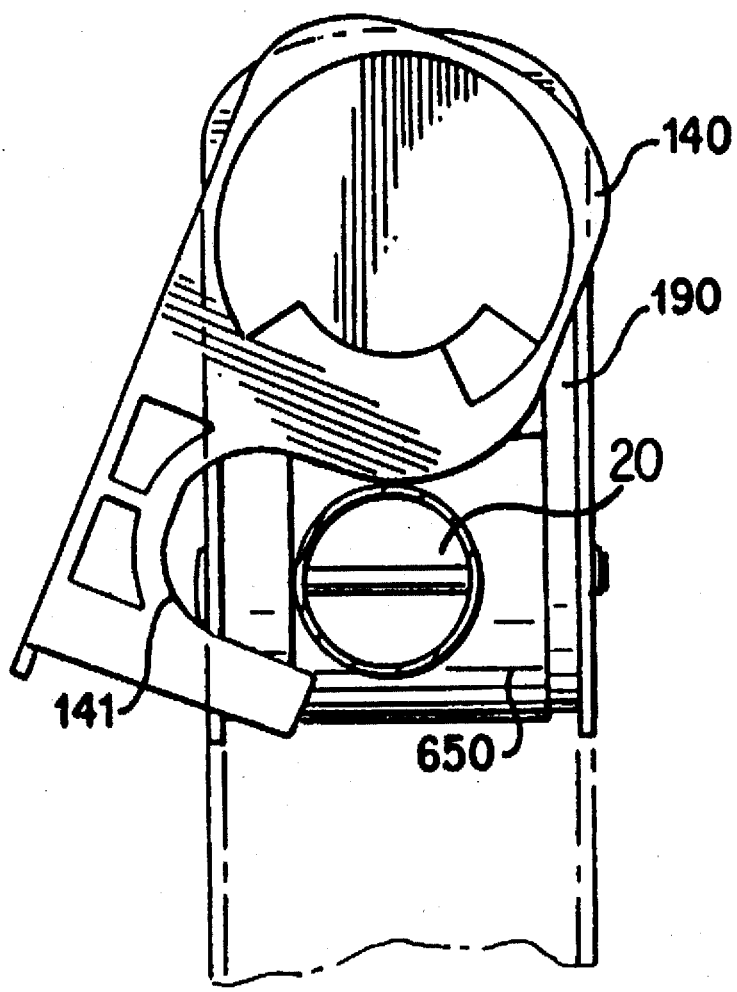
FIG. 5C is an end view of the side latch mechanism in an open unlocked position.
Figure 5D:
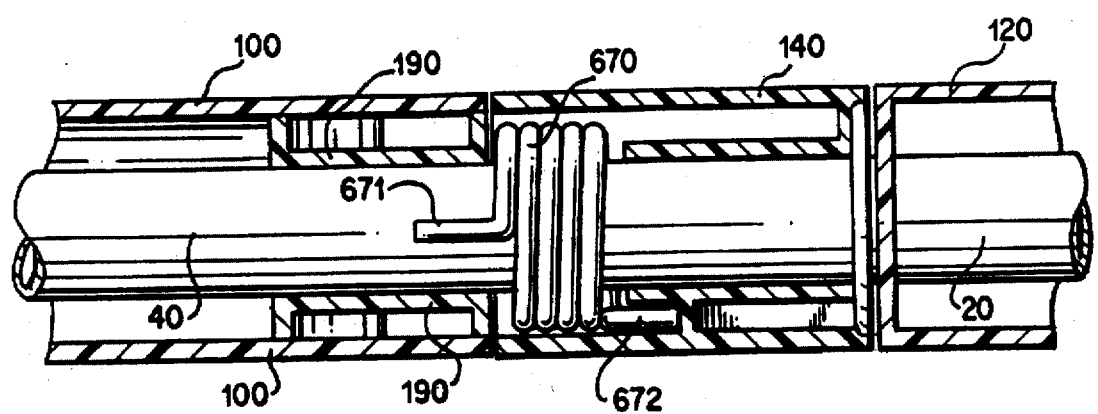
FIG. 5D is a top cut away/sectional view of the automatically-latching side label mechanism.
Figure 6A:
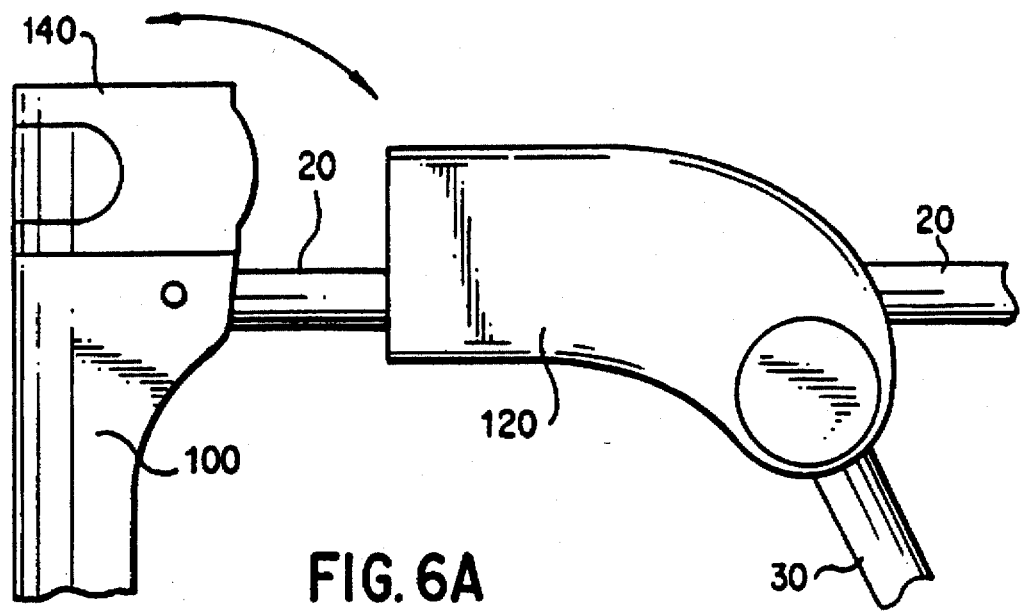
FIGS. 6A and 6B are side and top views, respectively, of the side hinge and side latch mechanism in a partially folded angled position.
Figure 6B:
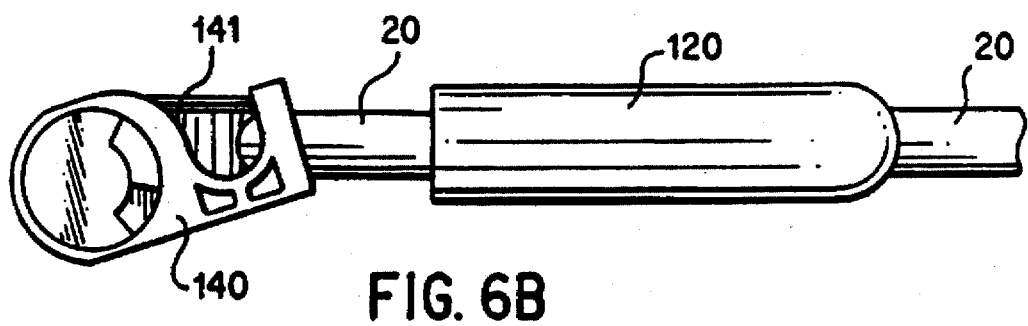
Figure 6E:
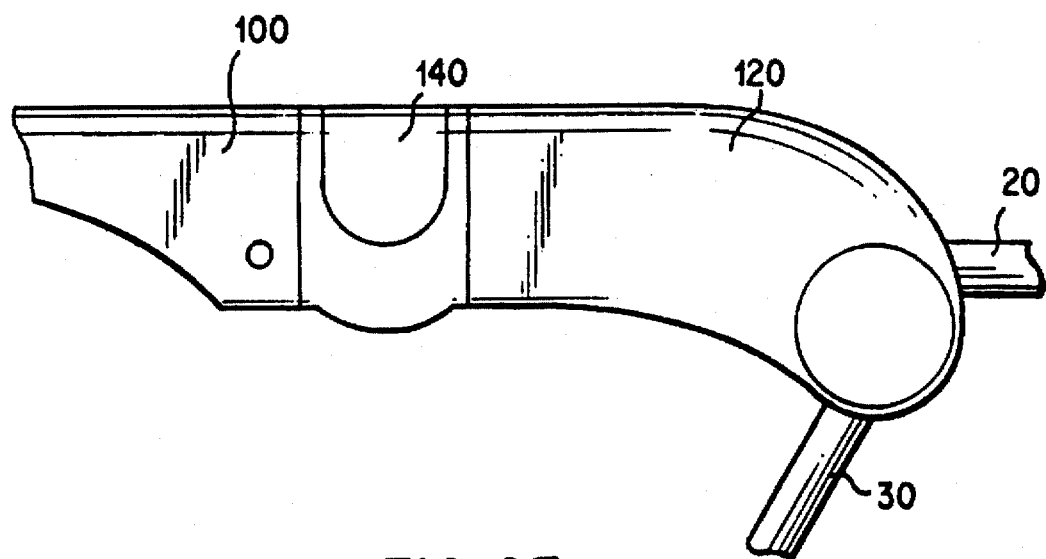
FIGS. 6E and 6F are side and bottom views, respectively, of the side hinge and side latch mechanism in a completely unfolded and locked position.
Figure 6F:
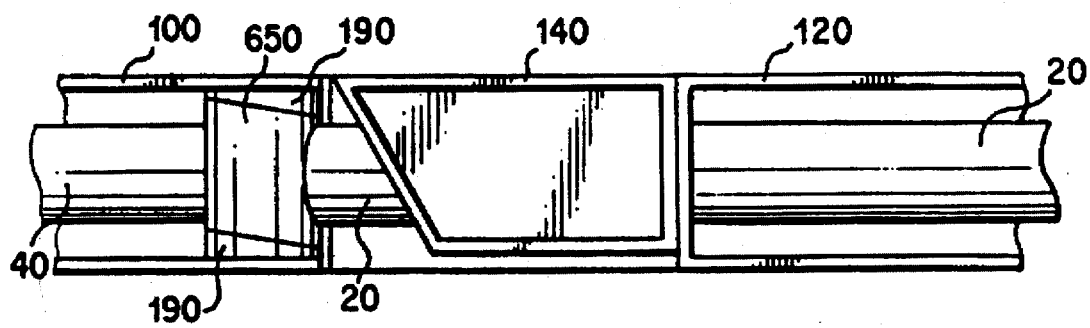

To reconfigure the stroller from the folded position to the open unfolded position, the handle tube 20 is pivoted relative to the front tubes 40, 45 and will move through a range of angled positions including the angled position shown in FIGS. 6A and 6B. As the handle tube 20 continues to be pivoted, it reaches the intermediate position shown in FIGS. 6C and 6D, at which point the lower edges 142 of the latch handles 140, 150 come into a sliding camming contact with a portion of the handle tube 20. This camming contact urges the latch handles 140, 150 to be rotated outwardly, against the spring biased pressure. This permits the handle tube 20 to continue to be pivoted upwards relative to the front tubes 40, 45 until the handle tube 20 and the front tubes 40, 45 are substantially parallel as shown in FIGS. 6E and 6F. At this point, the side latch handles 140, 150 are free to rotate inward so that the inner grooves 141, 151 engage and entrap the handle tube 20. (The locked position with the latches 140, 150 rotated inward is shown in FIG. 5B, 6E and 6F.) The inward biasing force on the latch handles 140, 150 that is provided by the torsional coil springs 670,680 urges the handles into this closed position. The stroller is now locked in the completely unfolded operative position until both latch handles 140, 150 are simultaneously rotated outward (the latches are shown rotated outward in FIG. 5C) against the spring pressure again to permit folding of the stroller.

5. Seat Belt Restraint

Figure 7:
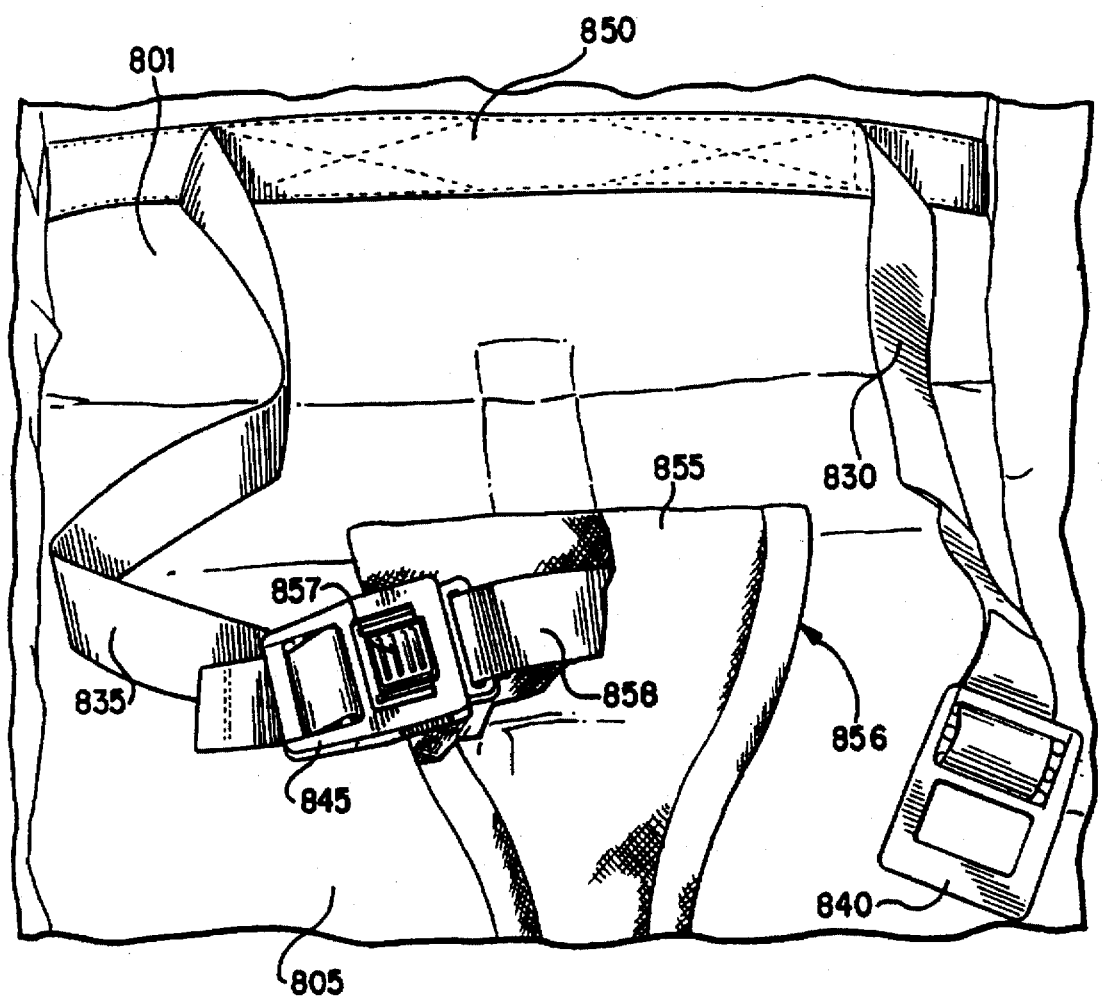
FIG. 7 is a perspective view of the child restraint seatbelt.

Shown in FIG. 7 is a seat belt assembly constructed in accordance with the present invention. The seat belt assembly of the present invention includes a pair of waist straps 830, 835, that are permanently attached to a horizontal strip 850 located on the front section of the back rest portion 801.

The forward ends of the waist straps 830, 835 are coupled to female buckle parts 840, 845 adapted to engage with adjacent male buckle parts 856, 857 located on the main buckle 855 (male buckle 857 is hidden in FIG. 7). Both waist straps 830, 835 are adjustable at the intersection of the female buckle parts 840, 845 and the corresponding waist straps 830, 835. This is to accommodate children of smaller or larger sizes. As can be readily observed from FIG. 7, both female buckle parts 840, 845 are attached to their corresponding waist straps 830, 835 via weaving the waist strap 830, 835 through three parallel openings on the female buckle part 840, 845. The end of each waist strap 830, 835 is folded over itself to prevent the waist straps 830, 835 from completely disassociating themselves from their corresponding female parts 840, 845.

The third component of the seat belt arrangement consists of a center crotch strap 855 constructed to extend upwardly from the seat bottom 805 to the waist straps 830, 835. The center crotch section 855 is positioned between the legs of the child seated in the stroller. The crotch strap 855 has its remote end permanently attached to the surface of the seat 805 through stitching. This creates a permanent attachment therebetween to prevent removal of the crotch strap 855 from the stroller seat 805.

As can be readily seen in FIG. 7, the male backle parts 856, 857 of the seat belt assembly are permanently attached to a center crotch section 855 of the restraining device by a stitched loop 858 of conventional strapping material which is stitched to the material comprising the center crotch section 855. Thus, the male buckle parts 856, 857 are always in position for use and always attached to the crotch strap 855. This configuration prohibits use of the waist straps 830, 835 without the center crotch strap 855 since the male buckle parts 856, 857 are permanently attached to the center crotch strap 855. The center crotch strap 855 is constructed such that the material creates an envelope surrounding the otherwise exposed male buckle parts 856, 857, said envelope decreasing in width traveling down towards the seat 805.

In a preferred embodiment the envelope is stitched closed, allowing sufficient room for the male buckle parts 856, 857 and the femalebuckle parts 840, 845 to be completely covered when in the locked position. The overall appearance of the center crotch strap 855, when viewed from the front of the stroller is tapered as shown. The envelope is formed by folding a portion back on itself and stitching the top of the free end of the center crotch material 855 to its location of intersection with the remaining center crotch strap material 855. In alternative embodiments, the envelope might partially cover the male and female buckle parts or not cover them at all.

As illustrated in FIG. 7, each female buckle part 840, 845 has a receptacle for receiving the free ends of the male buckle parts 856, 857 attached to the center crotch strap 855. The female buckle parts 840, 845 are adapted to receive the inwardly flexible resilient finger of their counterpart male buckle parts 856, 857. The female buckle parts 840, 845 are rectangular in nature, having an opening in the center allowing for direct access to the male parts 856, 857 by the user when the male parts 856, 857 are in the locked position, said opening being the means by which the male 856, 857 and female parts 840, 845 are uncoupled.

As illustrated in FIG. 7, each male part 856, 857 has a central resilient appendage movable by the operator for coupling and uncoupling with respect to the female parts 840, 845.

When inserted, the resilient finger of the male buckle parts 856, 857 cams downward towards the underside of the female parts 840, 845 due to the inclination of the male appendage with respect to the female opening. When in the locked position, the resilient finger will spring back to its original position, effectively locking the male 856, 857 and female parts 840, 845 together until the resilient finger is urged inwardly by the user so as to uncouple the seat belt.

The side straps 830, 835, horizontal strip 850, male part connecting strap 858, and the center crotch section 855 are fabricated in the preferred embodiment of conventional strapping material.

6. Automatically Engaging Brake when Frame Folded

Figure 8A:
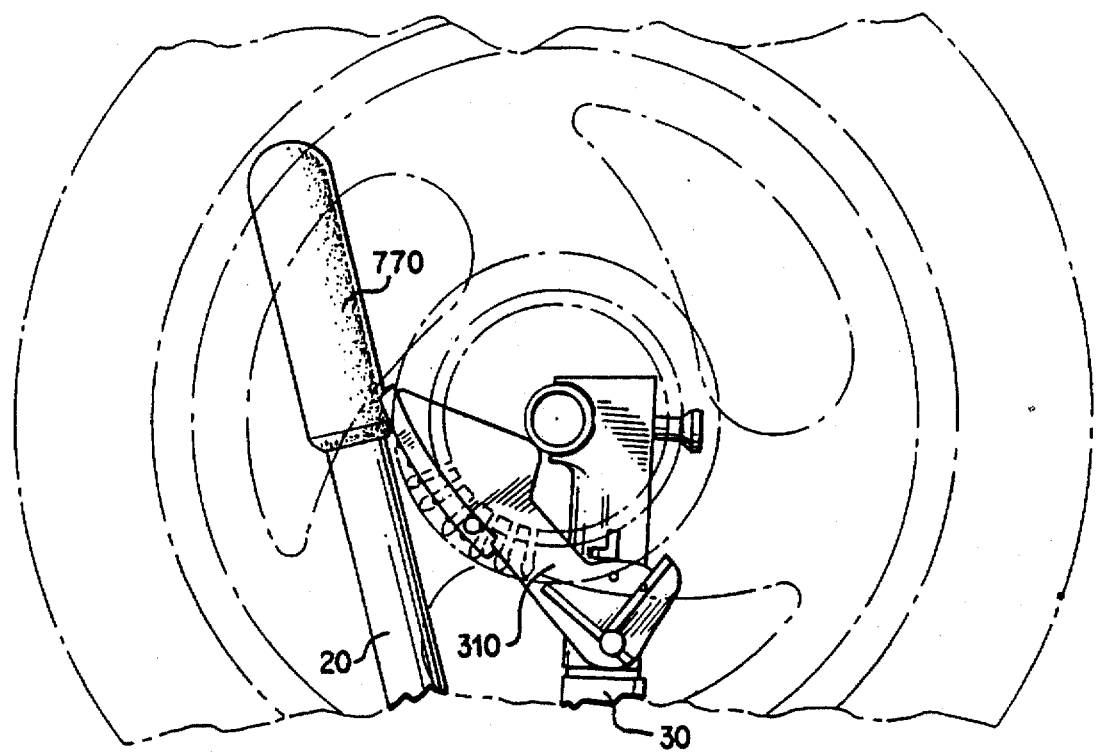
FIGS. 8A and 8B are side and top views, respectively, of a part of the stroller in the fully folded position.
Figure 8B:
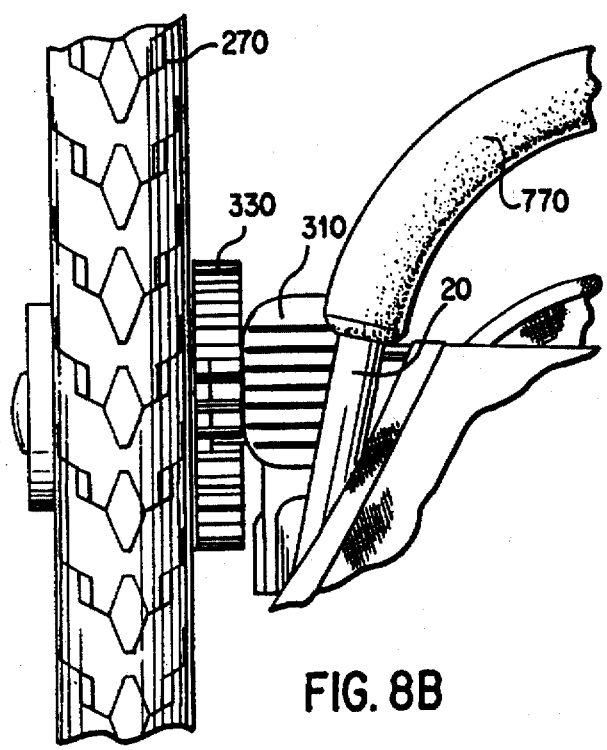
Figure 8C:
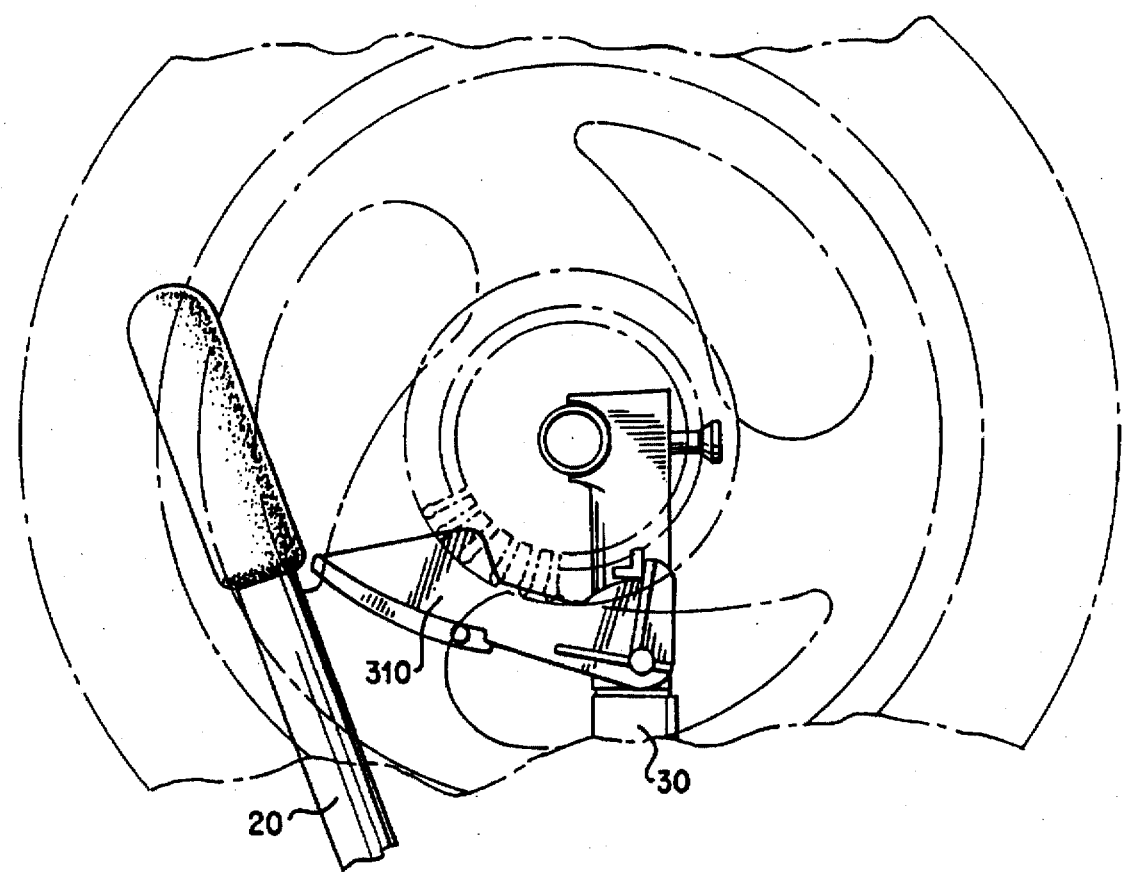
FIG. 8C is a side view of the part of the stroller shown in FIG. 8A in a nearly fully folded position.

Turning now to FIGS. 8A through 8C, it will be seen that the handle tube 20 and the rear tube 30 are arranged so that when the stroller frame is fully folded, a portion of the handle tube 20 contacts each of the brake members 300, 310 and forces the brake levers 300, 310 downward so that they the engage a wheel tooth to lock the respective rear wheel 260, 270.

In this way, fully folding the stroller frame always locks both rear wheels. Then, the brake 300, 310 is held in the locked position by the frictional contact of the pins 301, 311 in the wheel teeth 361, 371 so that when the stroller is unfolded, the rear wheels 260, 270 are already locked and remain locked. This is advantageous, since this will prevent the stroller from rolling away immediately after it has been unfolded and also hold the stroller stable while, for example, putting a child or other objects in the stroller. Also, since the rear wheels 260, 270 are automatically locked when the stroller is fully folded, the folded stroller may be set on its rear wheels 260, 270 and rested leaning against a wall, for example, and the rear wheels will not roll out from under the bottom of the stroller. After the stroller is unfolded, the brakes 300, 310 can be easily released when desired, by manually raising both rear brake levers 300, 310.

7. Folding Sequence and Hinge Angles

Figure 10D:
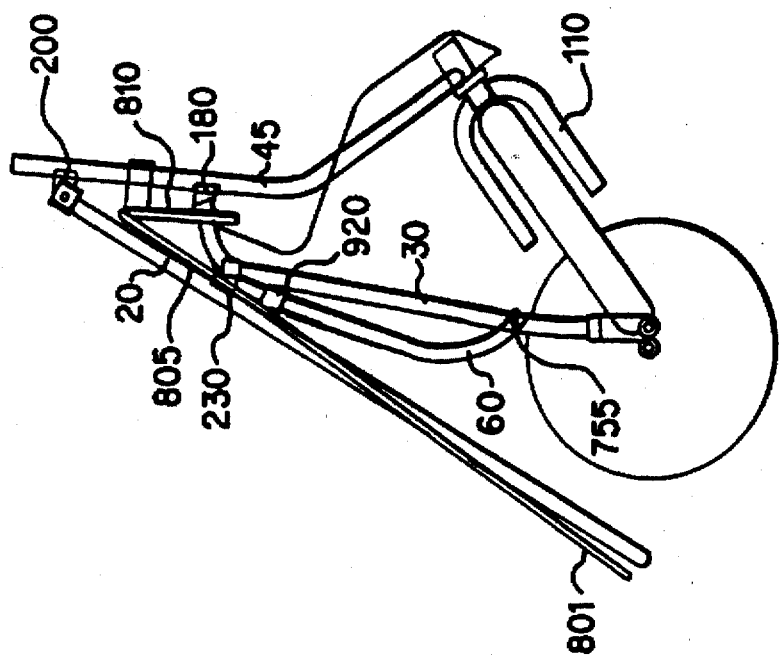

The folding sequence will now be described making particular reference to FIGS. 10A through 10F. Depicted in FIG. 10A is the stroller as it appears in the fully unfolded position. Note the orientations and connections of the handle tube 20, the rear support tube 30, the left and right seat tubes 50 and 60 (only tube 50 is visible), and the left and right front tubes 40 and 45 (only tube 45 is visible). To commence the folding process, the spring loaded latches 140, 150 am rotated out away from the handle tube 20 by the user (in the manner shown in FIG. 5c).

As illustrated in FIG. 10B, when the latches 140, 150 are disengaged, the frame begins to fold about the intersection between the handle tube 20 and the front tubes 40, 45 located just below the location of the latches 140, 150. While the handle tube 20 rotates downward, the left and right front tube 40 are pulled upward, effectively pulling the front wheel 320 toward the rear wheels 260, 270. There is additional rotation at both the intersection of the left front tube 40 and the left seat tube 50 and at the intersection of the right front tube 45 and the right seat tube 60 (only the right seat tube 60 is visible). The left and right seat tubes 50, 60 are pulled upward and toward the rear support tube 30 at this intersection. The left and right seat tubes 50, 60 also rotate about the intersection with the rear support tube 30. The rotation is the same as that about the intersections of the front tubes and the seat tubes; upward and towards the rear.

Figure 10C:
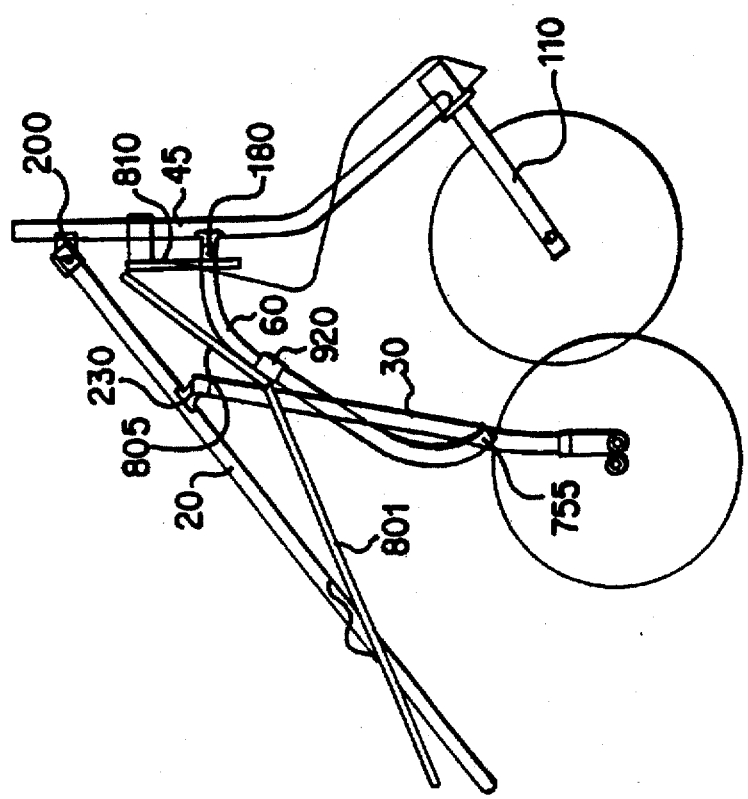

As illustrated in FIG. 10C, as the frame collapses, the front tubes 40, 45, the handle tube 20, and the seat tubes 50, 60 all continue to rotate toward the rear support tube 30 in the same fashion as described above. The ends of the front tubes 40, 45, once connected to the handle tube 20, now lie in a plane perpendicular to the horizontal. The handle tube grip 770, which was originally angled upward, is now angled downward via rotation about the front tubes 40, 45 and the rear support tube 30. As further illustrated in FIG. 10C, the reclining seat shifts its position as the rotation occurs. The reclining seat remains fixed at the handle tube 20 intersection (via screws through holes 890, 895 in the seat fabric webs 815, 820) and at the connections to the head tubes 40, 45 (via screws through leg rest flap located just above the horizontal strap 940). However, the seat bottom 805 slides along the left and right seat tubes 50, 60 during the folding process. As also illustrated in FIG.10C, the loop formed by the coupling of the seat mount straps 920, 925 around the seat tubes 50, 60 slides upward and towards the front of the stroller. The back rest portion 801 now lies on the other side of the handle tube 20, rotating about its connection with the seat portion 805. The seat portion 805 and the exposed end of the leg rest flap 810 are brought closer together throughout the folding process.

The sliding loop formed by the seat mount straps 920, 925 provides an important advantage. (Of course other sliding or travelling connections might be used). Since the loop slides along the seat tubes as discussed above, the entire folding and unfolding process may be performed with the seat back in either of the reclined or upright positions—the stroller thus returns, when unfolded, to the same seat back position (reclined or upright) it had before folding. Also, a rigid non-bending seat back may be utilized and still achieve the fold described above.

FIG. 10D illustrates the folding process near its most folded state. At this stage, the back rest portion 801 extends through the handle tube 20 and lies in nearly the same plane as the seat portion 805. The loop formed by the coupled seat mount straps 920, 925 has substantially traversed the seat tubes 50, 60 toward the intersection of the seat tubes 50, 60 and the front tubes 40, 45. The seat tubes 50, 60 protrude through the u-shaped space defined by the rear support tube 30.

Figure 10F:
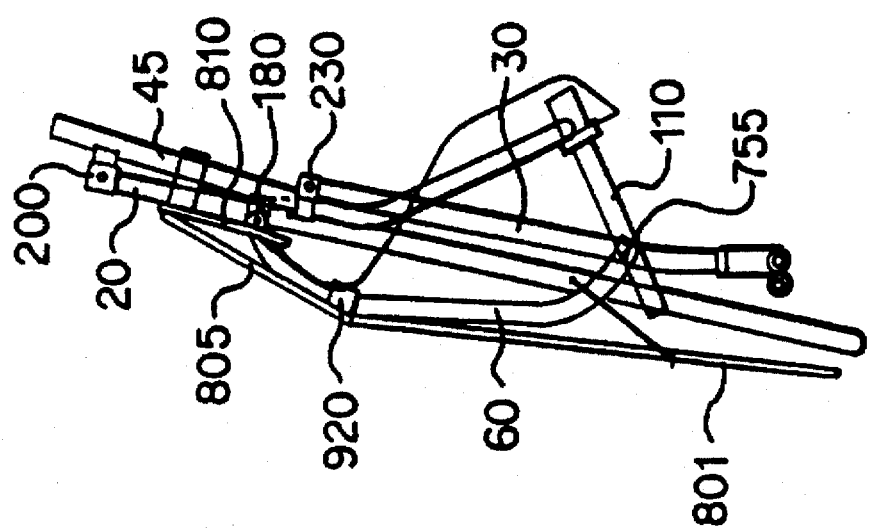
Figure 10E:
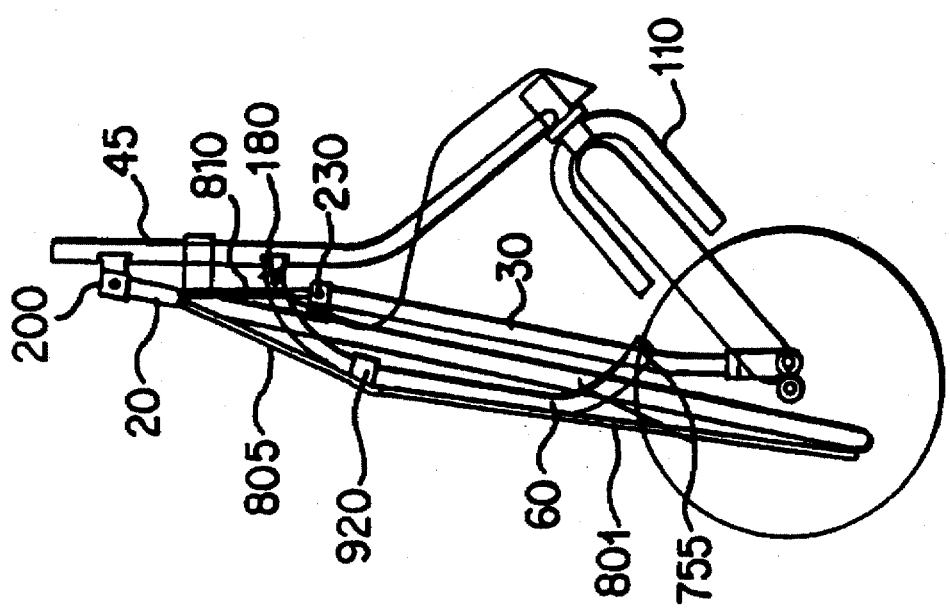

FIG. 10E illustrates the completely folded state of the stroller with its wheels attached. Note that the back rest portion 801 is bent backward in relation to the seat portion 805. The seat tubes 50, 60 are in direct contact with the rear of the back rest portion 801 and are protruding through the handle tube 20. The horizontal aspects of all of the members are nearly parallel with one another, with the exception of the bend in the front tubes 40, 45 and the fork assembly 110.

As FIG. 10F illustrates, the stroller can be compressed even further by removing the wheels, which may optionally be laid flat between the rear portion of the back rest 801 and the front fork assembly 110. Note that this folding process may be accomplished whether the seat is in the upright or reclined position.

Figure 9:
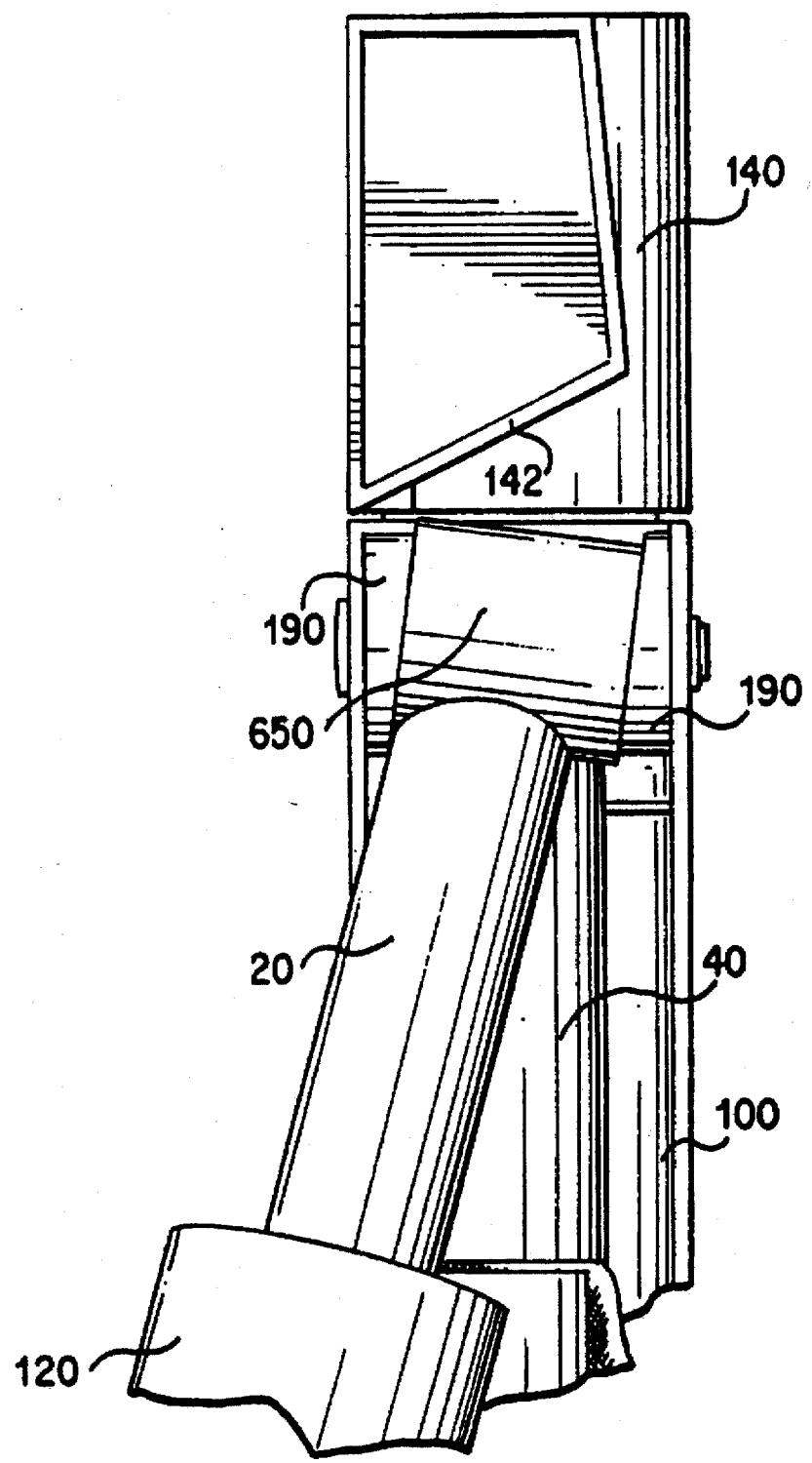
FIG. 9 is a rear view of the side hinge in the fully folded position.

As shown in FIG. 9, the handle tube 20 and the seat tube 40, which are generally parallel when the stroller is fully unfolded, are angled in two planes when the stroller is folded. This is because the fold axis on both sides is the same axis and is perpendicular to the center line of the stroller. This fold axis is therefore similar to that of a four wheeled stroller having generally parallel sides when both unfolded and folded. In such a stroller the fold axis is generally perpendicular to the axis of the longitudinal axis of the tubes. However, in the case of the preferred embodiment of the invention, the fold axis is not perpendicular to the longitudinal axis of tubes 40 and 20 as shown. The pivot mount 190 and bushing 650 are shaped to account for the difference in angles of the fold axis and the longitudinal axis of the tubes. The other fold axis of the pivot points of the stroller fold are similarly perpendicular to the center line of the stroller—not necessarily perpendicular to the various tube members themselves.

What is claimed is:

1. A folding stroller having a frame with a substantially centered longitudinal axis, comprising:
    a front wheel positioned substantially on the longitudinal axis;
    a front member having a front wheel support portion for supporting said front wheel and a pair of front member ends;
    a rear handle member having a handle portion and a pair of handle member ends pivotally coupled to said front member ends;
    a pair of rear wheels both laterally offset from the longitudinal axis;
    a rear support member having a pair of rear wheel support portions, each said rear wheel support portion supporting a respective one of said rear wheels and said rear support member having a pair of rear support member ends pivotally connected to said handle member;
    a coupling mechanism releasably connecting said rear wheels to said rear wheel support portions; and
    a pair of side members each having a first side member end and a second side member end,
    wherein said first side member ends are each pivotally connected to said front member between said front wheel supporting portion and one of said pair of front member ends and said second side member ends are each pivotally connected to said rear member.

2. The folding stroller of claim 1 wherein said second side member ends are each pivotally connected to said rear member between one of said rear wheel support portions and one of said rear support member ends.

3. A stroller comprising:
    a frame having a central longitudinal axis and including:
        a front member having a front wheel support portion positioned substantially on said longitudinal axis and first and second front member ends spaced laterally about said longitudinal axis;
        a handle member having a handle portion and first and second handle member ends spaced laterally about said longitudinal axis and pivotally connected to said first and second front member ends, respectively;
        a rear support member having first and second rear wheel support portions and first and second rear support member ends spaced laterally about said longitudinal axis, said rear support member ends being pivotally connected to said handle member at a location between said handle portion and said first and second handle member ends;
    first and second side members each having a front end and a rear end;
    wherein said front ends of said first and second side members are pivotally connected to said front member and said rear ends of said first and second side members are pivotally connected to said rear member;
    a front wheel coupled to said front member; and
    first and second rear wheels coupled to said first and second rear wheel support portions, respectively.

4. A stroller comprising:
    a front member having a longitudinal axis, a front wheel support portion positioned substantially on said longitudinal axis and first and second front member ends spaced laterally about said longitudinal axis;
    a handle member having a handle portion and first and second handle member ends spaced laterally about said longitudinal axis and pivotally connected to said first and second front member ends, respectively;
    a rear support member having first and second rear wheel support portions and first and second rear support member ends spaced laterally about said longitudinal axis, said rear support member ends being pivotally connected to said handle member; and
    first and second side members each having a front end and a rear end;
    wherein said front ends of said first and second side members are pivotally connected to said front member and said rear ends of said first and second side members are pivotally connected to said rear member.

5. The stroller of claim 4 further comprising:
    a front wheel coupled to said front member; and
    first and second rear wheels coupled to said first and second rear wheel support portions, respectively.

6. The stroller of claim 5 wherein:
    said rear wheels are removably coupled to said rear wheel support portions.

7. The stroller of claim 5 wherein:
    said front wheel is pivotally coupled to said front member.

8. The stroller of claim 4 wherein:

said handle portion is U-shaped.

9. The stroller of claim 4 further comprising:

a footrest/fender member mounted to said front member.

10. The stroller of claim 4 further comprising:

a first latch mounted to one of said first or second front member ends and selectively engageable with one of said first and second handle member ends to prevent relative rotation of said front member and said handle member.

11. The stroller of claim 10 wherein:

said first latch is rotatable around a longitudinal latch rotation axis of said front member end substantially perpendicular to an axis of pivotal movement between said handle member ends and said front member ends.

12. The stroller of claim 10 further comprising:

a second latch mounted to the other of said first or second front member ends and selectively engageable with the other of said first and second handle member ends to prevent relative rotation of said front member and said handle member.

13. The stroller of claim 10 wherein:

said frame is positionable between a first, folded configuration in which said handle portion and said front wheel support portion are located adjacent said rear wheel support portions and an acute angle is formed at the pivotal connection between said front member ends and said handle member ends and a second, unfolded position in which said front member ends and said handle member ends lie in substantially the same plane and are spaced from said rear wheel support portions.

14. The stroller of claim 4 further comprising:

a seat portion disposed between said first and second front member ends and said handle member.

15. The stroller of claim 14 further comprising:

a seat belt assembly attached to said seat portion.

16. The stroller of claim 15 wherein said seat belt assembly includes left and right waist strap belts coupled at first ends thereof to said seat portion and second, opposite ends thereof terminating in left and right belt connectors, a crotch belt coupled at a first end thereof to said seat portion and having a second, opposite end having a transverse strip terminating at opposite ends in left and right belt connectors coupleable with said left and right waist strap belt connectors, said transverse strip being coupled to said second end of said crotch belt at a middle portion of said transverse strip, and a fabric cover substantially covering said crotch belt, said cover tapering in width from said transverse strip to said first end of said crotch belt.

* * * * *